(12) United States Patent
Ishida et al.

(10) Patent No.: US 8,157,038 B2
(45) Date of Patent: Apr. 17, 2012

(54) SADDLE-RIDE TYPE VEHICLE

(75) Inventors: Yousuke Ishida, Shizuoka (JP); Akifumi Oishi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 711 days.

(21) Appl. No.: 11/461,318

(22) Filed: Jul. 31, 2006

(65) Prior Publication Data

US 2007/0023214 A1 Feb. 1, 2007

(30) Foreign Application Priority Data

Aug. 1, 2005 (JP) ................... 2005-222917

(51) Int. Cl.
*B60K 11/06* (2006.01)
(52) U.S. Cl. .................. 180/68.1; 180/68.2; 180/68.3
(58) Field of Classification Search .............. 180/68.1, 180/68.2, 68.3, 339, 229; 474/273, 93
See application file for complete search history.

(56) References Cited

U.S. PATENT DOCUMENTS

| | | | | |
|---|---|---|---|---|
| 2,145,545 A | * | 1/1939 | Johnson et al. | 474/29 |
| 4,697,665 A | * | 10/1987 | Eastman et al. | 180/230 |
| 4,712,629 A | * | 12/1987 | Takahashi et al. | 180/68.1 |
| 5,976,044 A | * | 11/1999 | Kuyama | 474/93 |
| 6,820,708 B2 | * | 11/2004 | Nakamura | 180/68.2 |
| 7,059,438 B1 | * | 6/2006 | Sheets | 180/68.1 |
| 2003/0066696 A1 | * | 4/2003 | Nakamura | 180/68.1 |
| 2005/0133194 A1 | * | 6/2005 | Lan et al. | 165/41 |

FOREIGN PATENT DOCUMENTS

| | | | | |
|---|---|---|---|---|
| JP | 02128976 A | * | 5/1990 | |
| JP | 2002-130440 | | 5/2002 | |
| JP | 2002130440 A | * | 5/2002 | |

* cited by examiner

*Primary Examiner* — J. Allen Shriver, II
*Assistant Examiner* — Bryan Evans
(74) *Attorney, Agent, or Firm* — Keating & Bennett, LLP

(57) ABSTRACT

Improved cooling capacity for a V-belt continuously variable transmission that is compatible with miniaturization of a vehicle body cover is provided in a saddle-ride type vehicle. A concave-shaped space recessed downward is compartmented forward of a seat by a vehicle body cover. An engine unit is supported by the vehicle body frame below the concave-shaped space. The engine unit includes a transmission case formed with a belt chamber in which a V-belt continuously variable transmission is accommodated. An intake duct defines an air passage communicated to the belt chamber. The intake duct is arranged between the transmission case and a leg shield.

19 Claims, 15 Drawing Sheets

[Fig. 1]
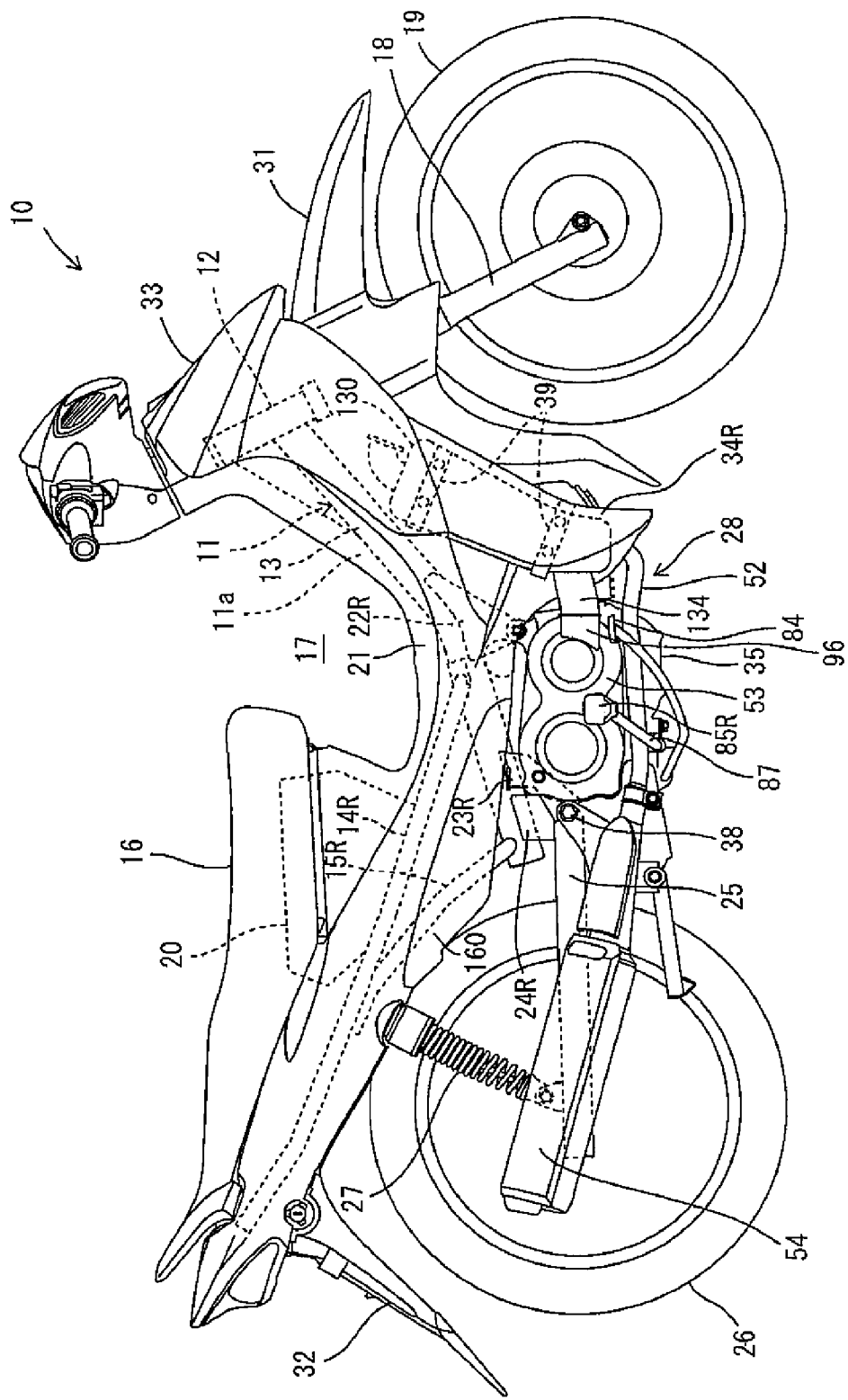

[Fig. 2]
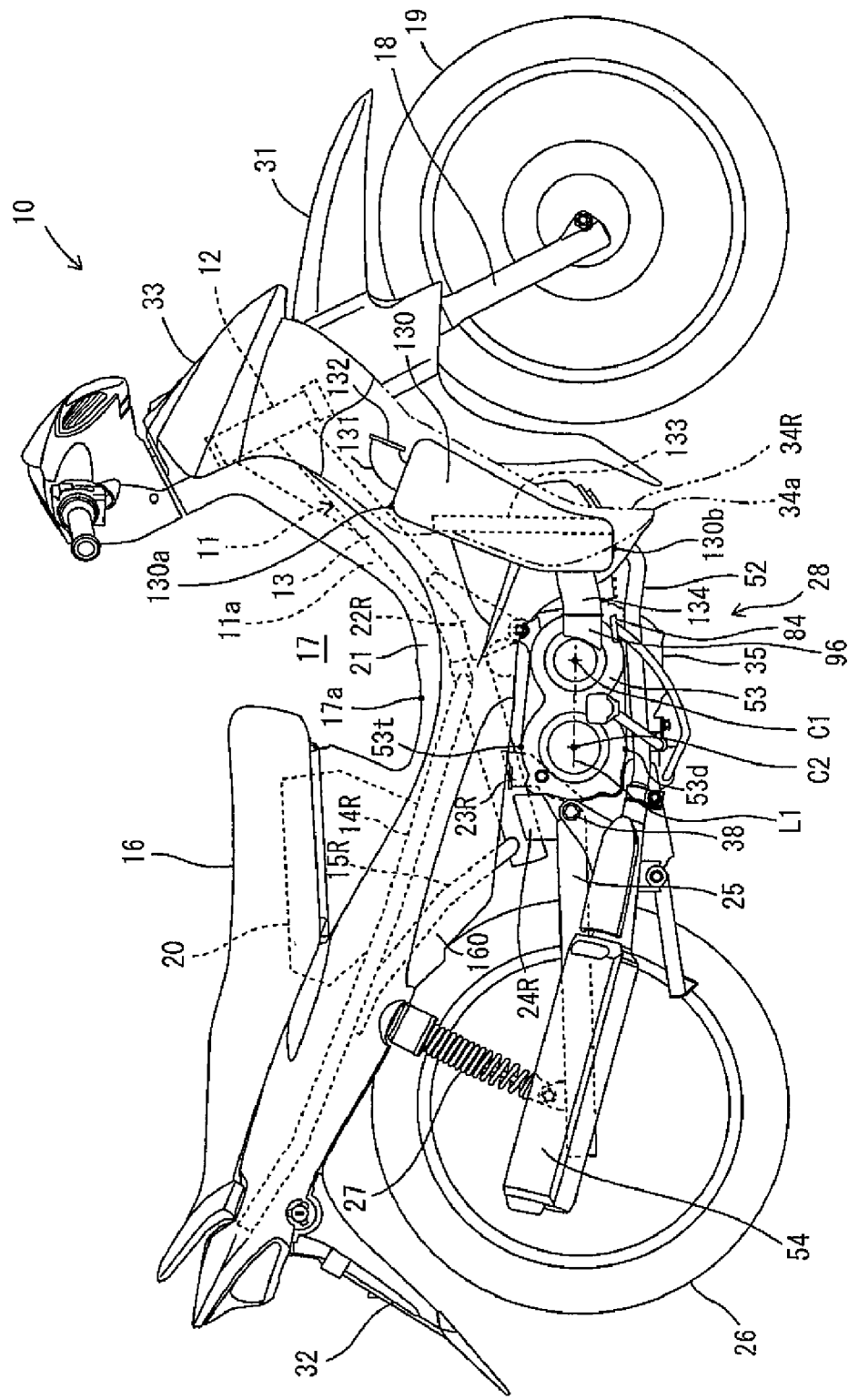

[Fig. 3]
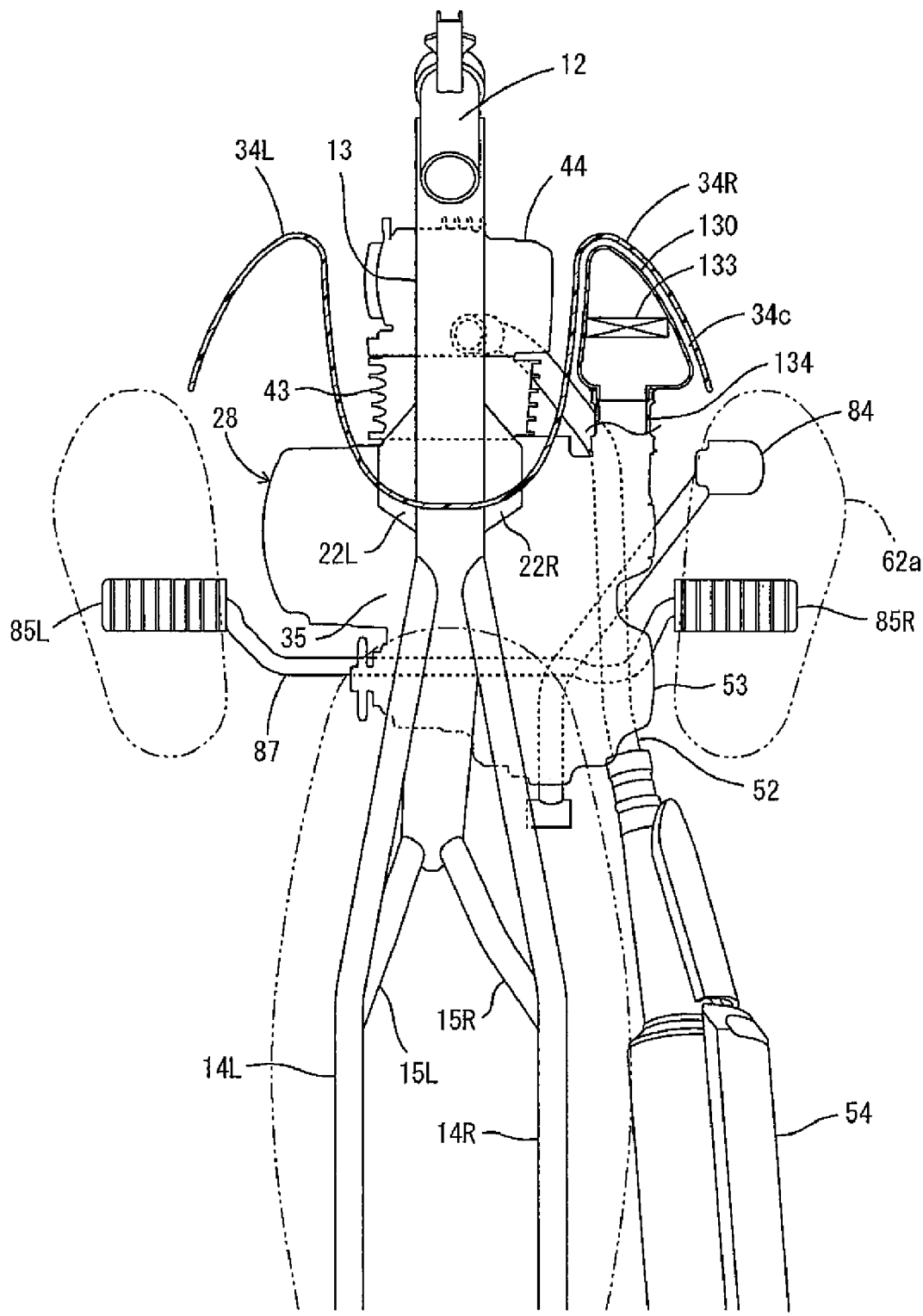

[Fig. 4]
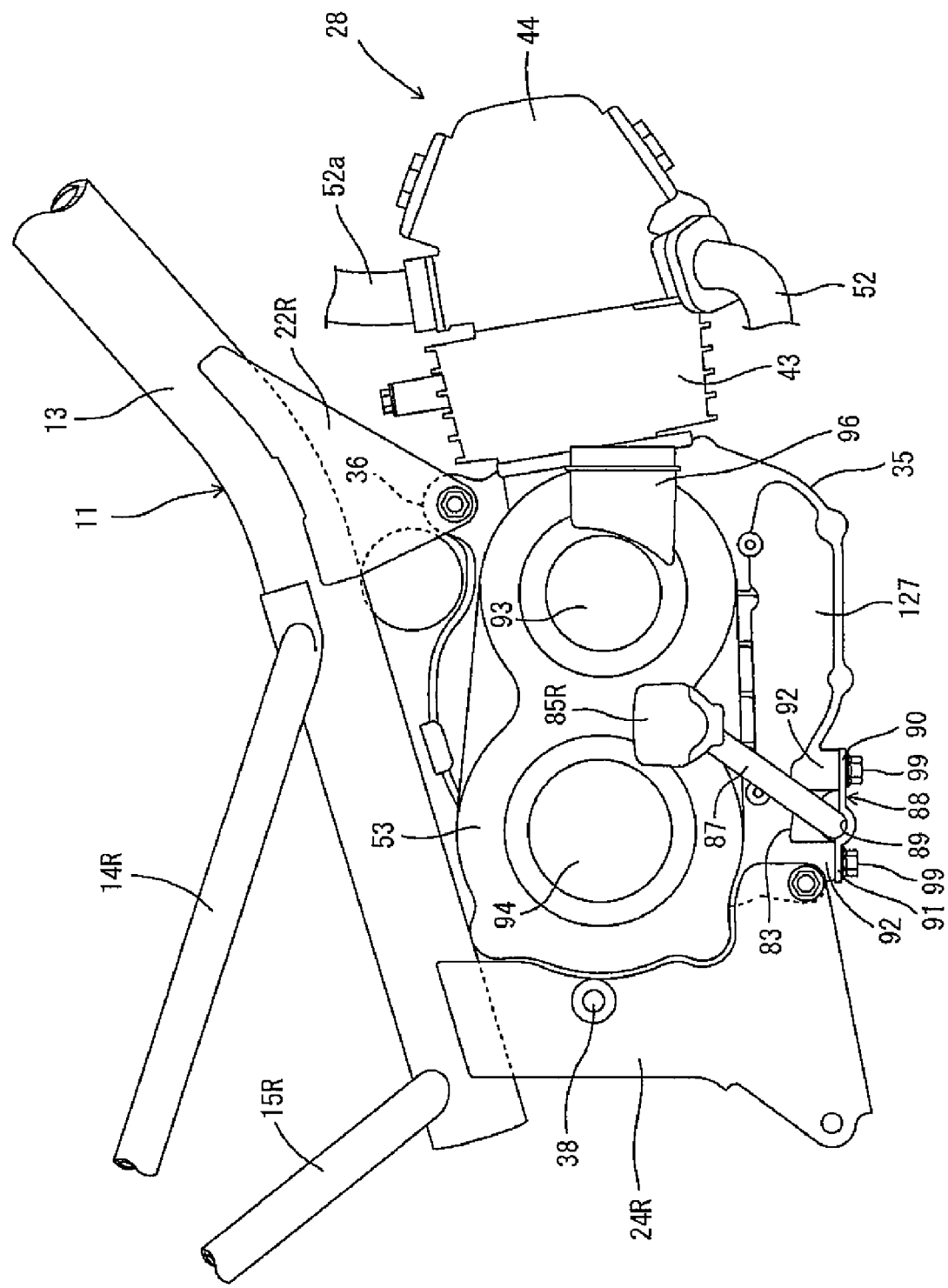

[Fig. 5]
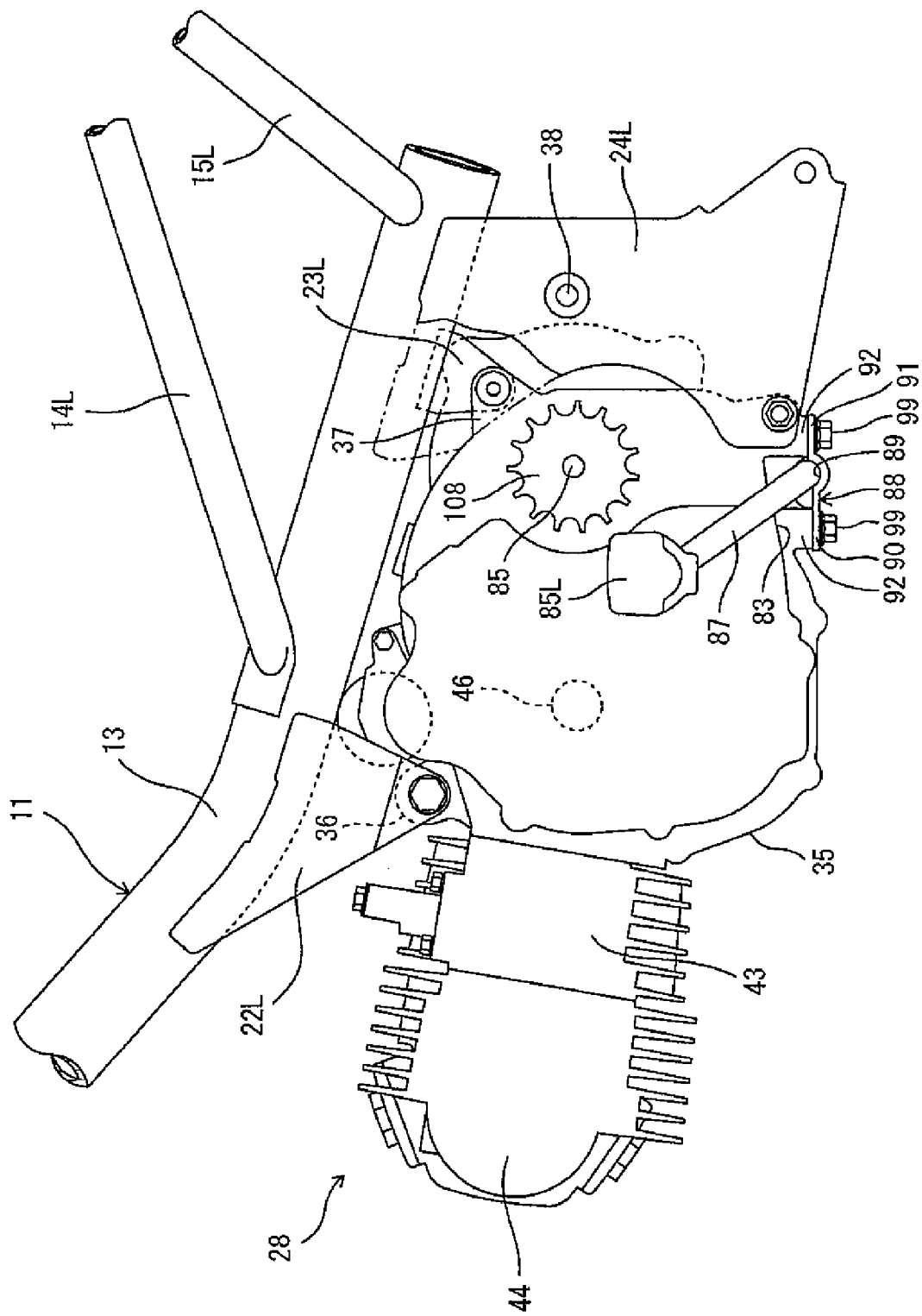

[Fig. 6]
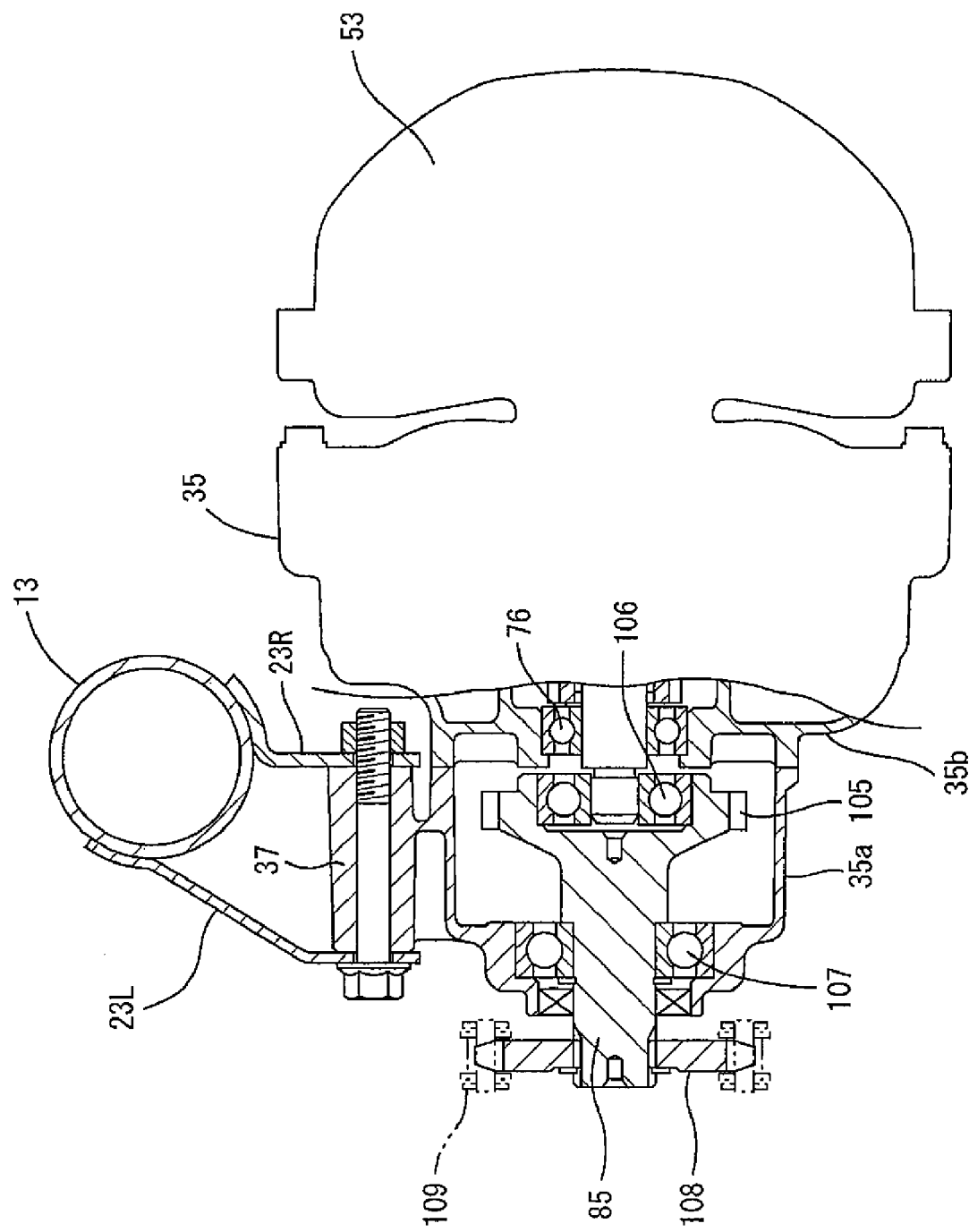

[Fig. 7]
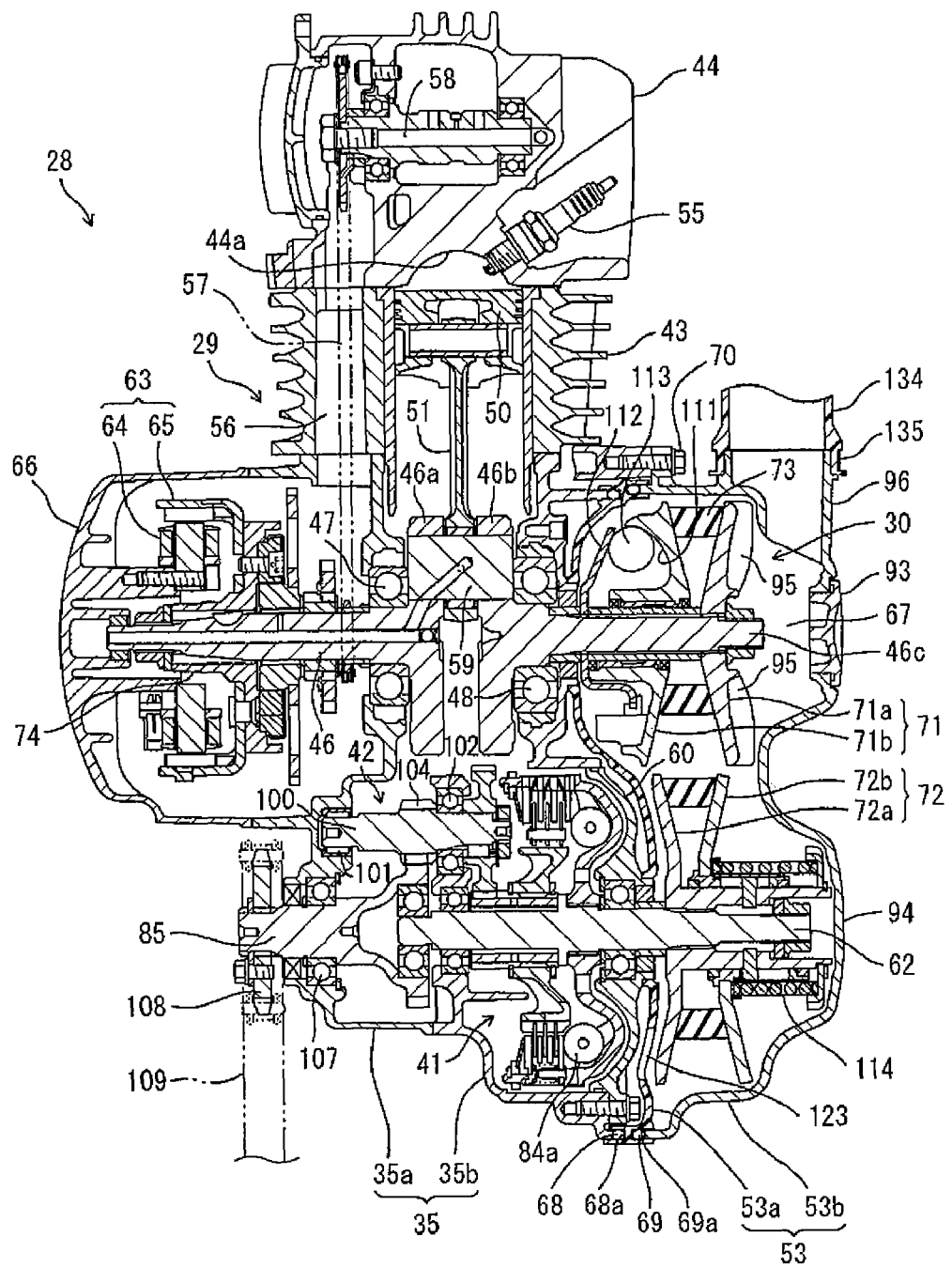

[Fig. 8]
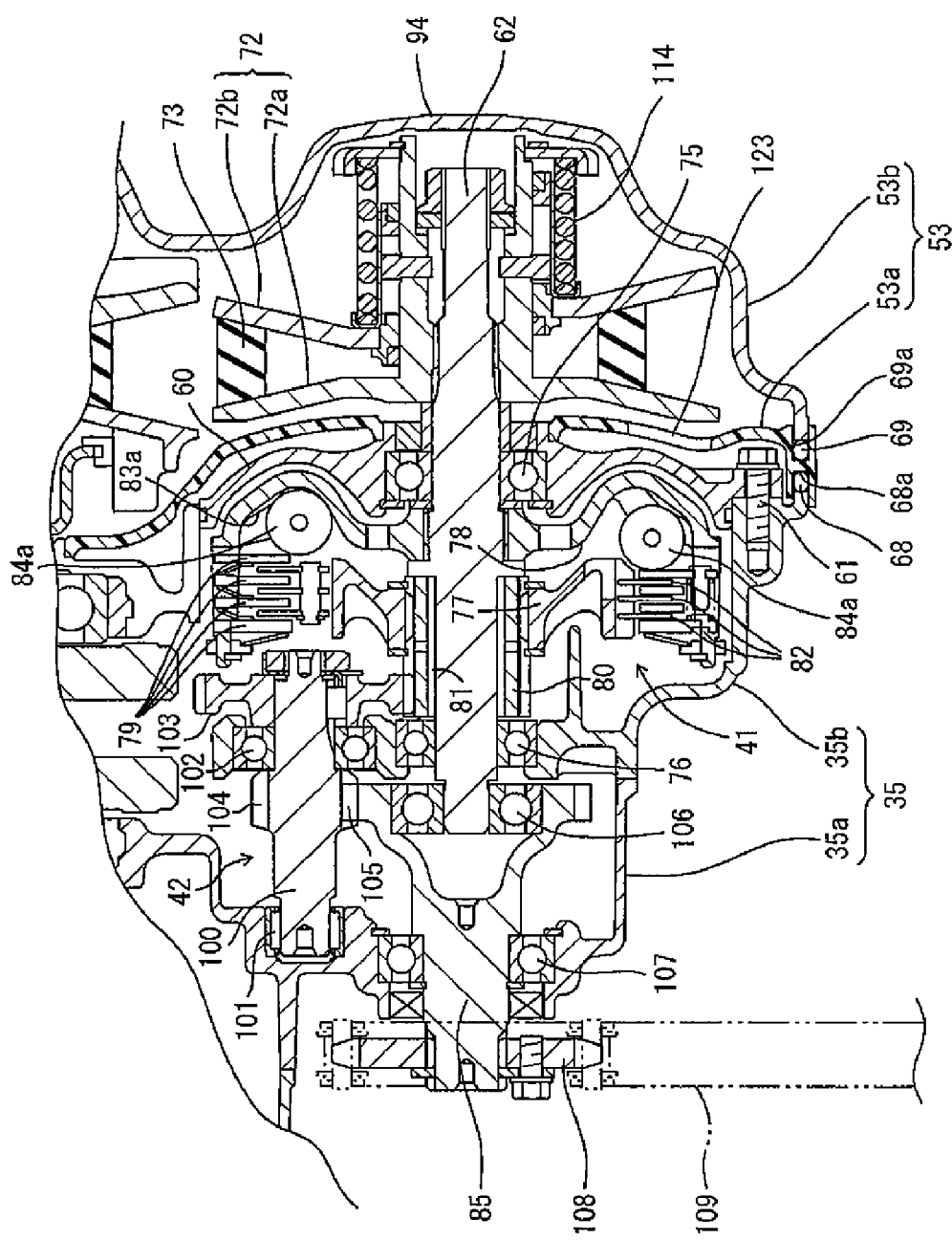

[Fig. 9]
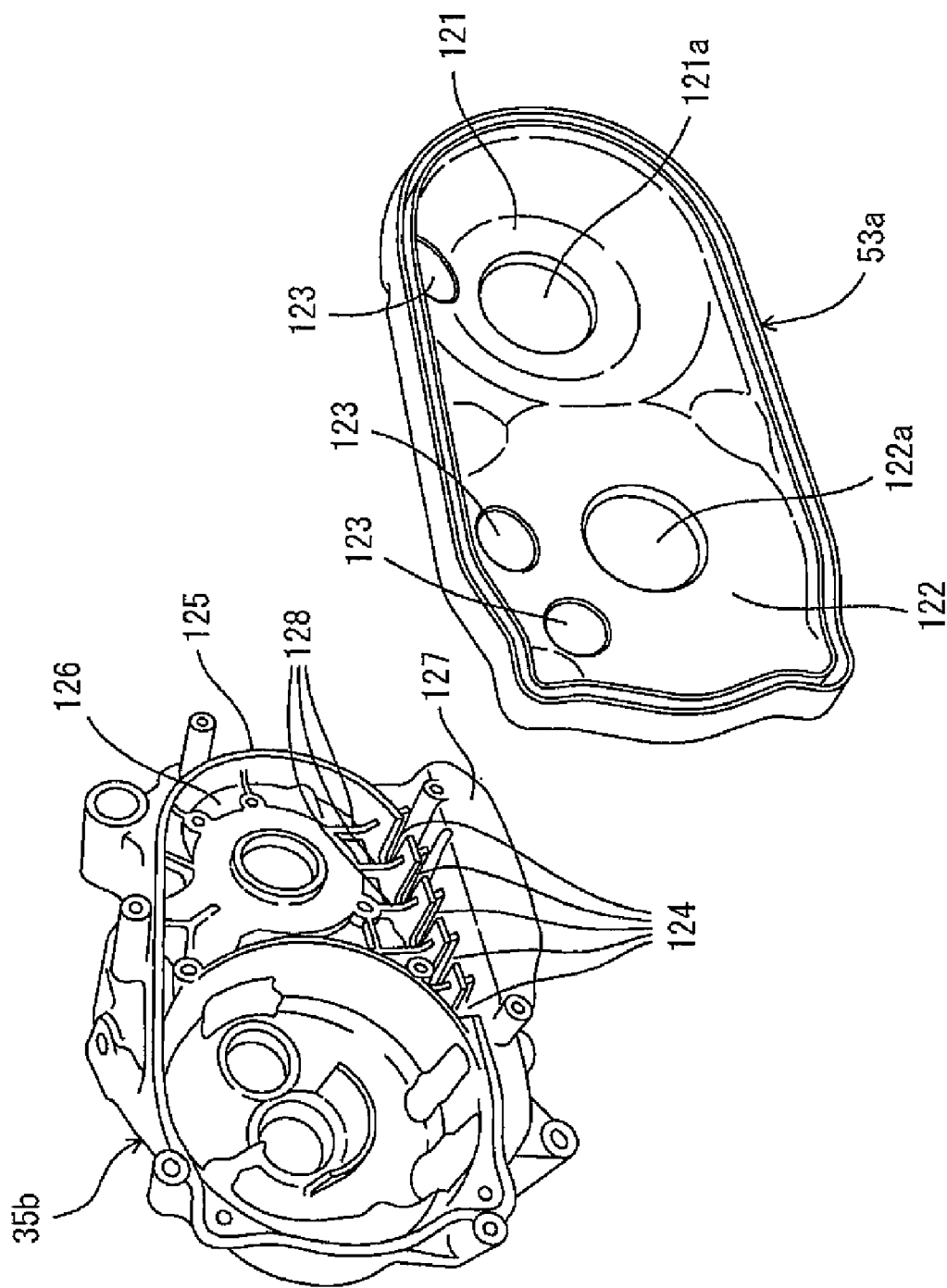

[Fig. 10]
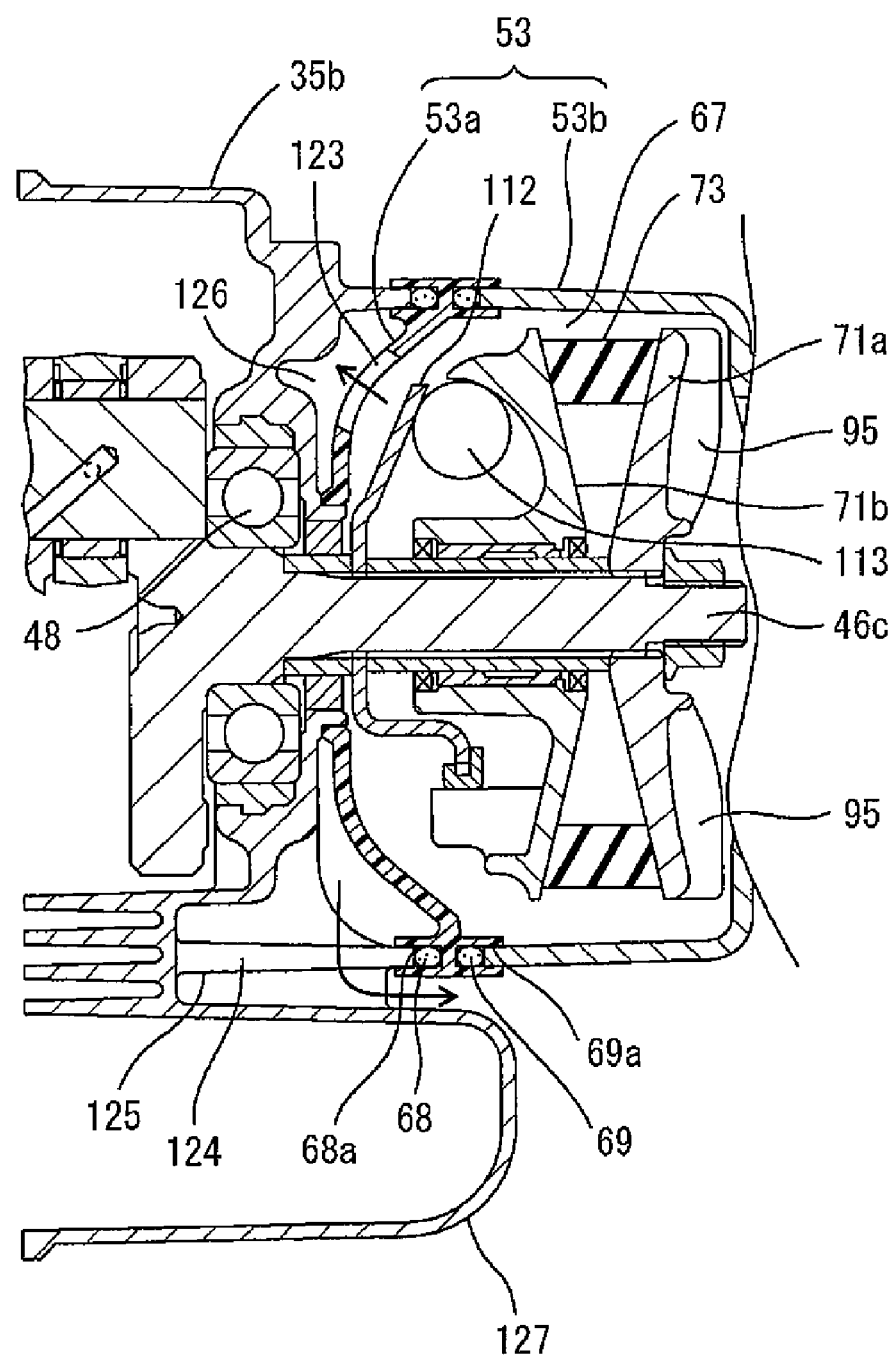

[Fig. 11]
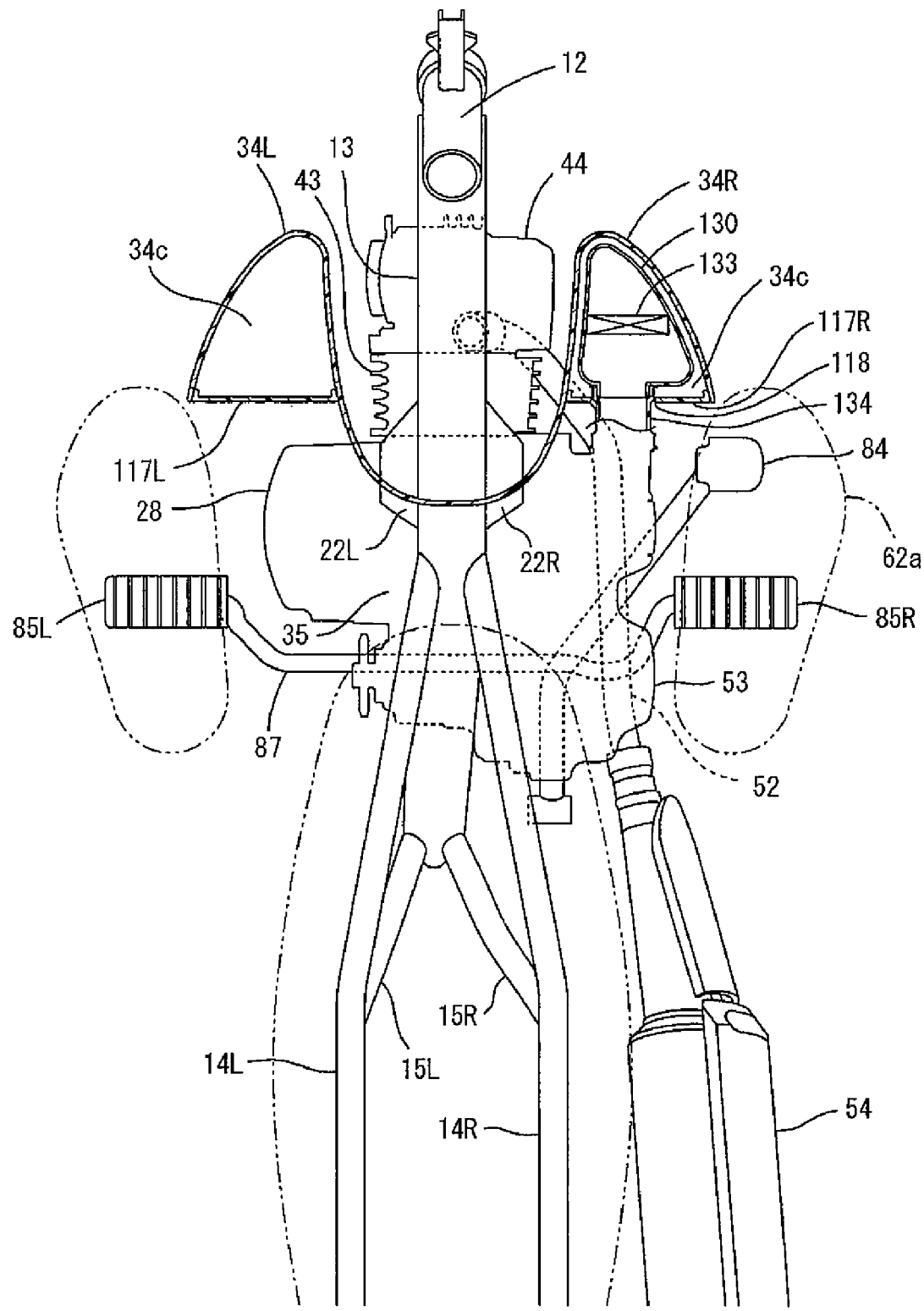

[Fig. 12]
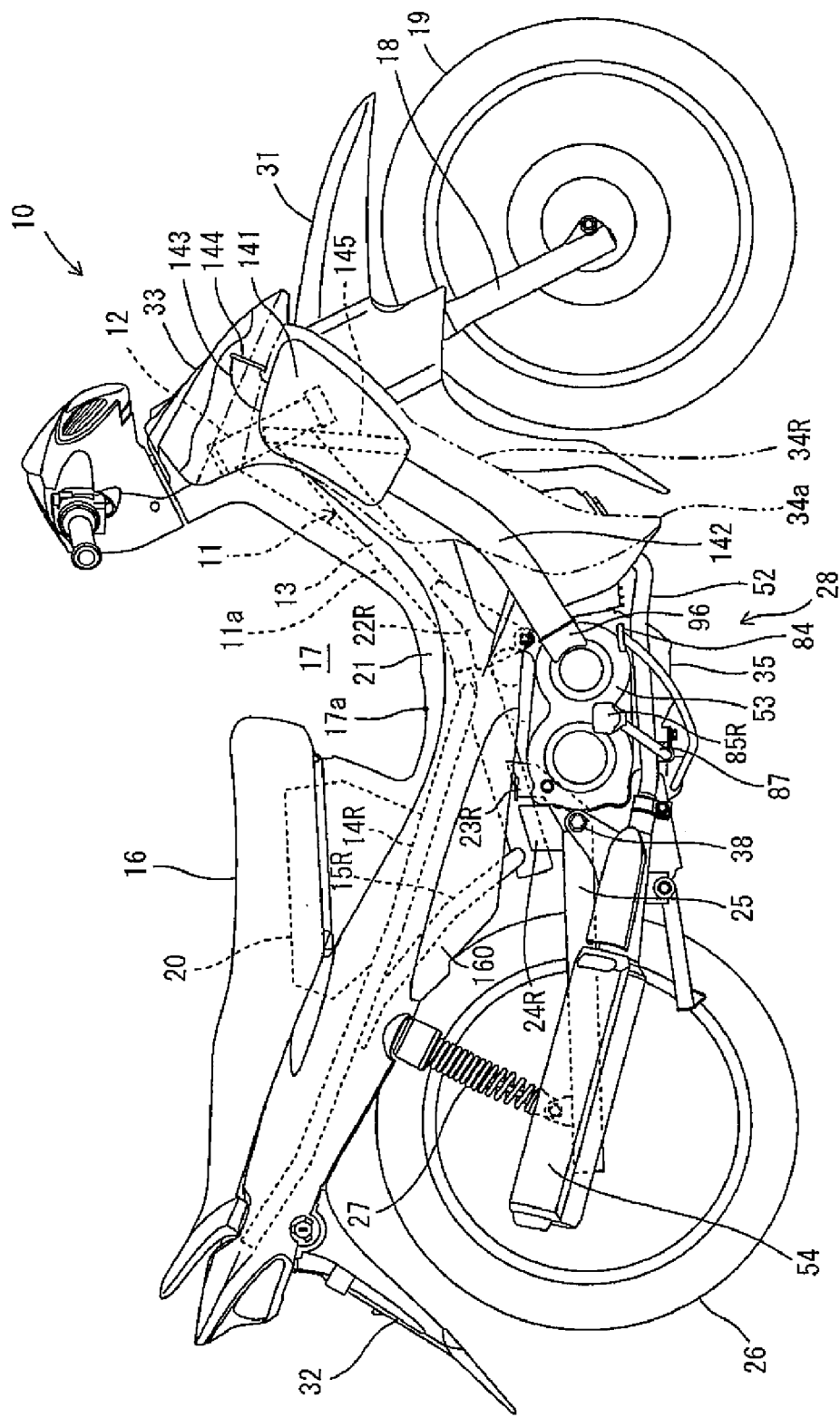

[Fig. 13]
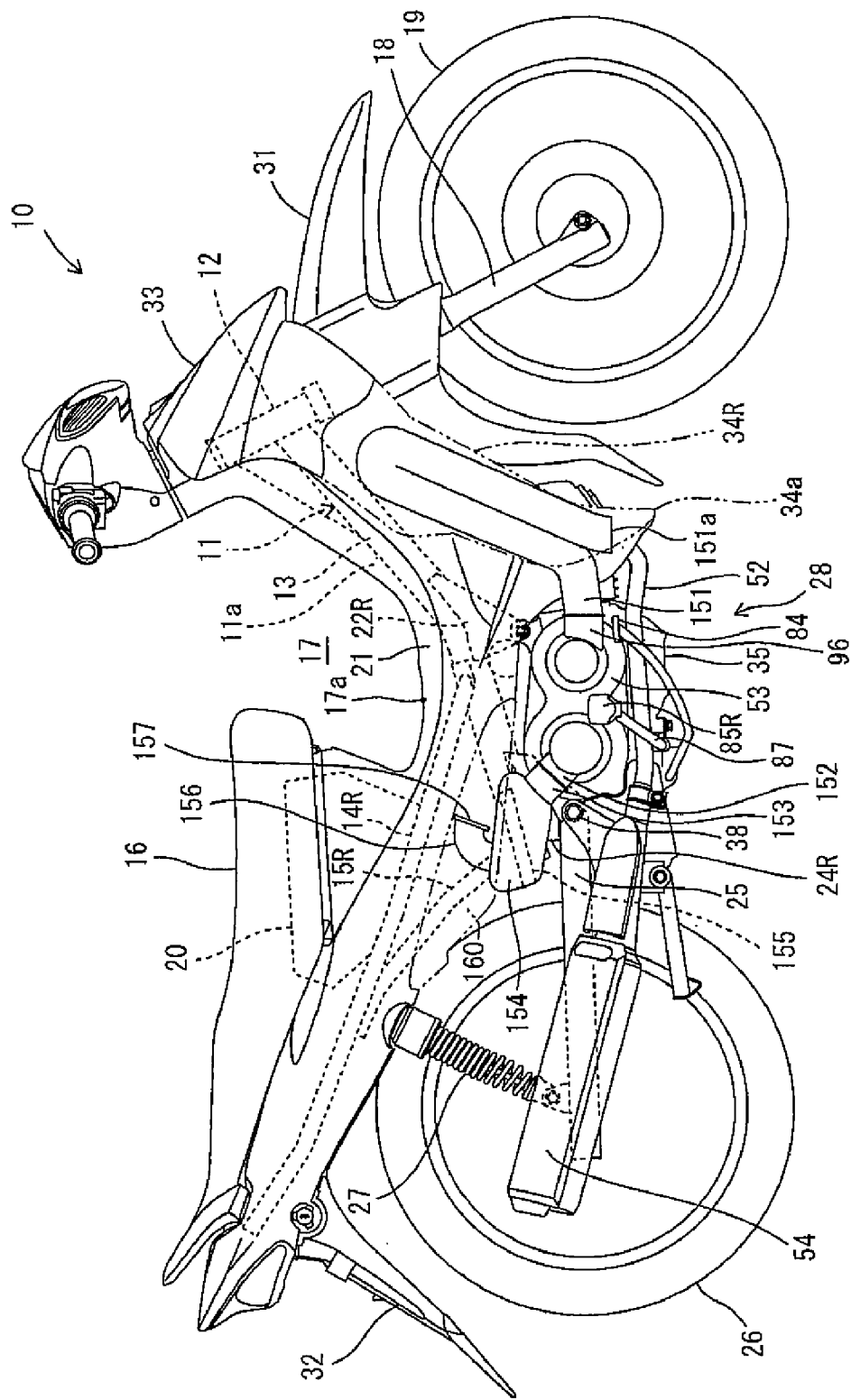

[Fig. 14]
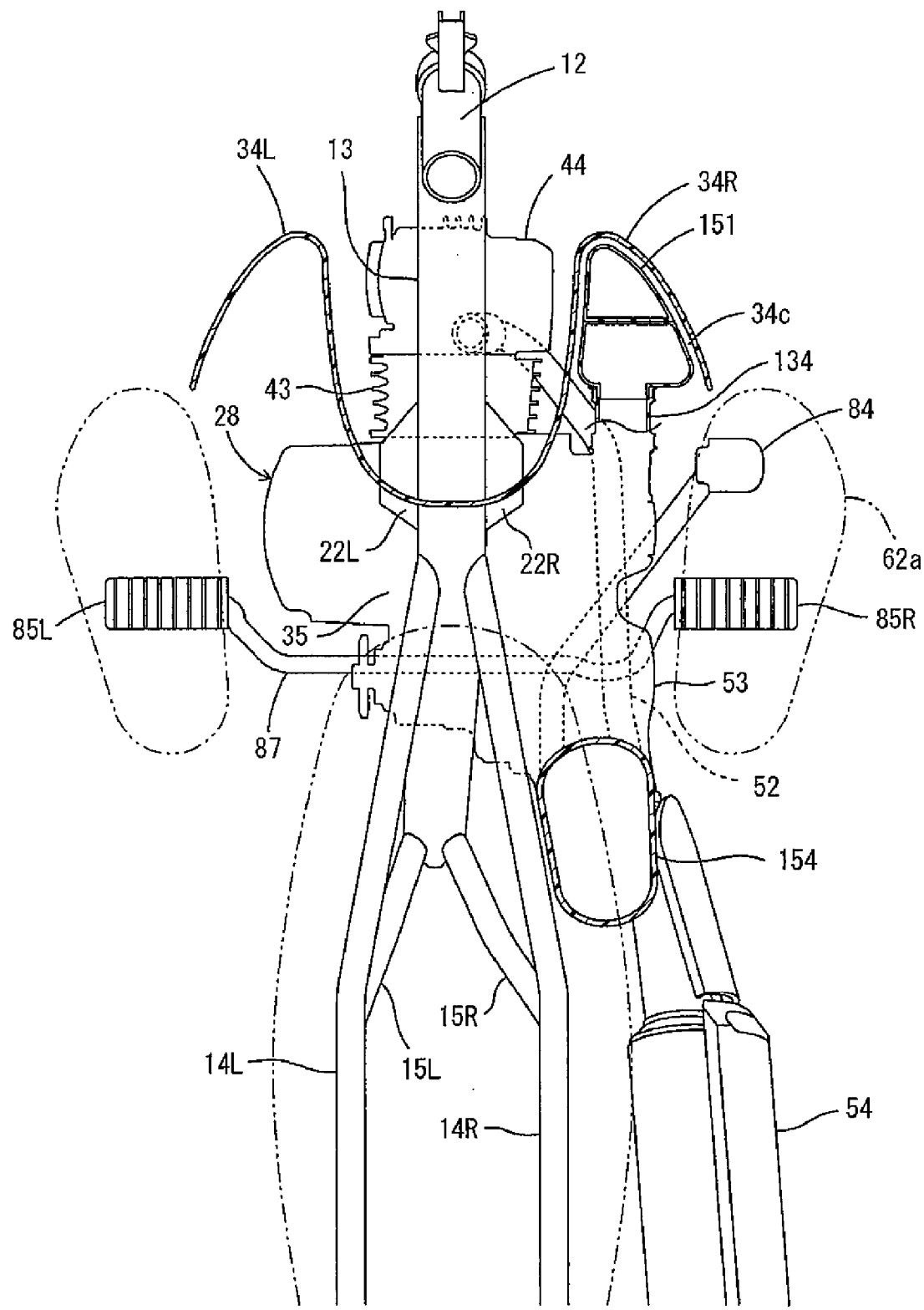

[Fig. 15]
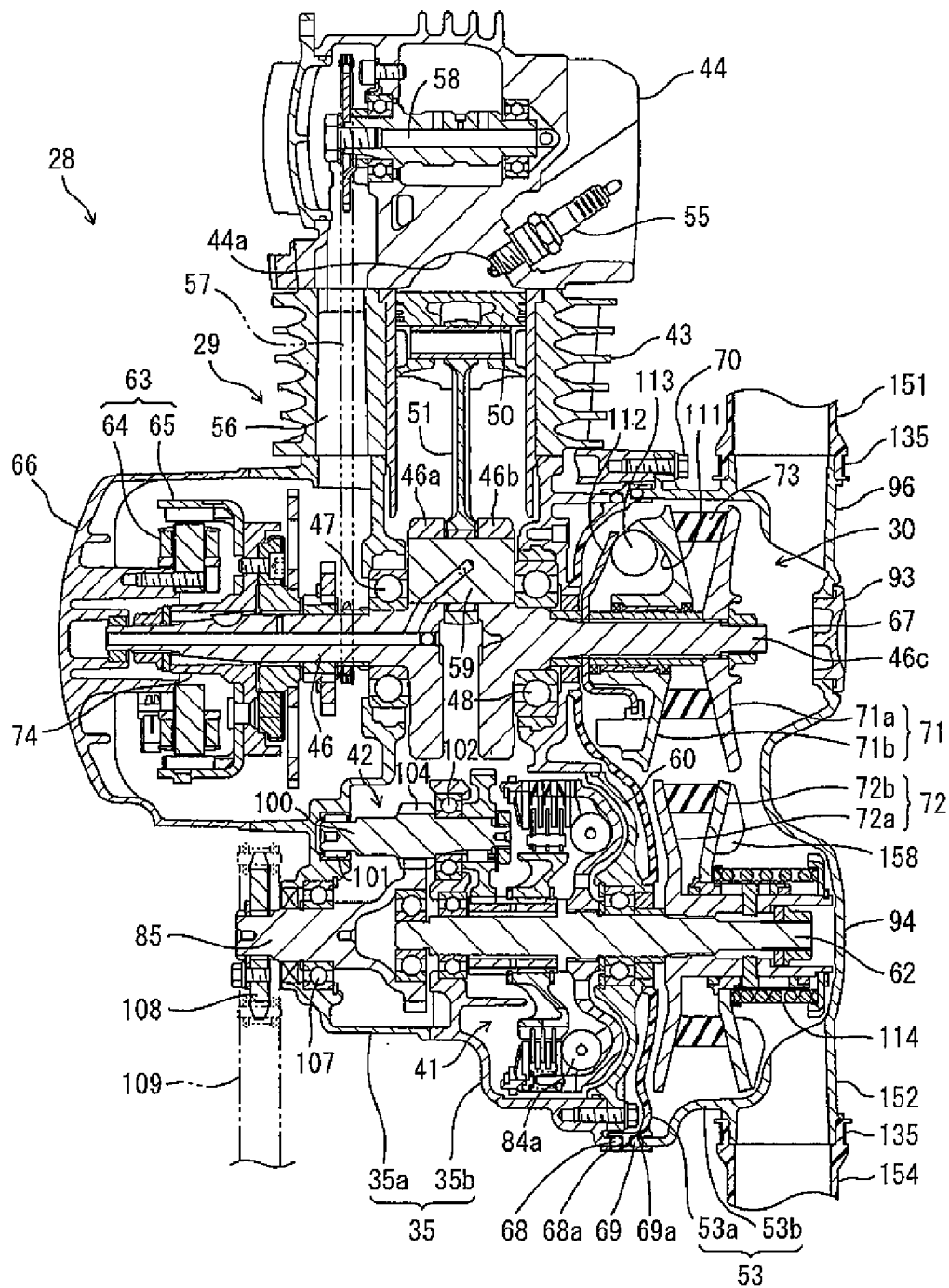

SADDLE-RIDE TYPE VEHICLE

RELATED APPLICATIONS

This application claims the benefit of priority under 35 USC 119 of Japanese patent application no. 2005-222917, filed on Aug. 1, 2005, which application is hereby incorporated by reference in its entirety.

BACKGROUND OF THE INVENTION

1. Field of the Invention

The present invention relates to a saddle-ride type vehicle provided with a V-belt continuously variable transmission.

2. Description of Related Art

Motorcycles including a V-belt continuously variable transmission are well known (see, for example, JP-A-2002-130440).

The V-belt of a V-belt continuously variable transmission increases in temperature during travel due to frictional heat, etc. Frequently, air is supplied from the outside to a belt chamber in which the V-belt is accommodated to forcedly cool the V-belt.

The motorcycle disclosed in JP-A-2002-130440 has a vehicle body frame that is substantially V-shaped as viewed from the side. The vehicle body frame is covered by a vehicle body cover and an engine is arranged in a substantially V-shaped valley portion of the vehicle body frame. A front inclined portion inclines forwardly and upwardly from the valley portion and a rear inclined portion inclines rearwardly and upwardly from the valley portion.

The motorcycle has an intake duct for introducing air into a belt chamber, and an exhaust duct for discharging air in the belt chamber to the outside. The intake duct extends substantially linearly along the front inclined portion of the vehicle body frame towards a position forward of a head pipe. The exhaust duct extends substantially linearly along the rear inclined portion of the vehicle body frame to a position above a rear wheel. Thus, the intake duct and the exhaust duct are disposed along the substantially V-shaped configuration of the body frame.

In the motorcycle disclosed in JP-A-2002-130440, however, the intake duct is arranged along the front inclined portion of the vehicle body frame within the vehicle body cover. Therefore, the vehicle body cover is increased in size corresponding to the intake duct. On the other hand, when the intake duct is decreased in diameter in order to decrease the vehicle body cover size, there is not enough flow passage cross sectional area (intake passage) in the intake duct, and the cooling capacity for the V-belt continuously variable transmission is decreased.

SUMMARY OF THE INVENTION

In view of these drawbacks of the prior art, the present invention provides both improved cooling capacity for a V-belt continuously variable transmission and downsizing of the body cover.

The invention provides a saddle-ride type vehicle having a frame. An engine unit is supported on the frame and includes an engine, a transmission case formed with a belt chamber and a V-belt continuously variable transmission accommodated in the belt chamber. An air passage communicates with the belt chamber. A leg shield is positioned and extends vertically on a side of the frame. A lower end of the leg shield is positioned below an upper end of the transmission case, and at least a part of the air passage is positioned between the transmission case and the leg shield.

According to the invention, since at least a part of the air passage is arranged between the transmission case and the leg shield, a space between the transmission case and the leg shield is effectively used as a space in which the air passage is provided. Therefore, an air passage having enough flow passage sectional area is formed without upsizing the vehicle body cover. Accordingly, both improved cooling capacity and downsizing of the vehicle body cover are provided.

According to the invention, both improved cooling capacity for a V-belt continuously variable transmission and downsizing of the vehicle body cover in a saddle-ride type vehicle are provided.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a motorcycle according to a first embodiment of the invention.

FIG. 2 is a side view of a leg shield of the motorcycle according to the first embodiment with a part thereof cut out.

FIG. 3 is a plan view showing positional relationships among the vehicle body frame, leg shield, engine unit, etc. of the motorcycle of FIG. 1.

FIG. 4 is a right side view of the engine unit.

FIG. 5 is a left side view of the engine unit.

FIG. 6 is a cross sectional view showing a state, in which the engine unit is mounted.

FIG. 7 is a cross sectional view showing an internal construction of the engine unit.

FIG. 8 is a cross sectional view showing an internal construction of a part of the engine unit.

FIG. 9 is an exploded, perspective view of a second case block and an inner case of a transmission case.

FIG. 10 is a cross sectional view of the second case block and the transmission case.

FIG. 11 is a plan view showing positional relationships among the vehicle body frame, leg shield, engine unit, etc. of a motorcycle according to a modification.

FIG. 12 is a side view of a leg shield of a motorcycle according to a second embodiment of the invention with a part thereof cut out.

FIG. 13 is a side view of a leg shield of a motorcycle according to a third embodiment of the invention with a part thereof cut out.

FIG. 14 is a plan view showing positional relationships among the vehicle body frame, leg shield, engine unit, etc. of a motorcycle according to the third embodiment.

FIG. 15 is a cross sectional view showing an internal construction of the engine unit of the motorcycle according to the third embodiment.

DETAILED DESCRIPTION OF THE INVENTION

An embodiment of the invention is described below with reference to the drawings.

First Embodiment

As shown in FIG. 1, a saddle-ride type vehicle according to a first embodiment of the invention is a motorcycle 10. The motorcycle 10 comprises a vehicle body frame 11, which makes a framework, and a seat 16, on which a passenger is seated. The motorcycle 10 is a so-called moped type motorcycle. That is, the motorcycle 10 includes a space 17 formed forwardly of the seat 16 to be recessed downward and shaped concave as viewed in side view, and a passenger seated on the seat 16 straddles the vehicle body frame 11 to ride. As used in the following description, "moped type" refers to a kind of vehicle in terms of shape, but provides no limitation in maximum speed, displacement, magnitude, etc. of a vehicle.

The saddle-ride type vehicle according to the invention is not limited to a moped type motorcycle but may be a motorcycle of other type such as, for example, a motorcycle type in which a fuel tank is arranged forwardly of a seat.

In the following description, front and rear, and left and right denote directions from the perspective of a passenger who is seated on the seat 16. The vehicle body frame 11 comprises a steering head pipe 12, a single main frame 13 extending rearwardly and obliquely downwardly of the steering head pipe 12, left and right seat rails 14L, 14R extending rearwardly and obliquely upwardly of an intermediate portion of the main frame 13, and left and right seat pillar tubes 15L, 15R connected to a rear end of the main frame 13 and intermediate portions of the seat rails 14L, 14R.

Upper, and left and right sides of the vehicle body frame 11 are covered by a vehicle body cover 21. The concave and downward-recessed space 17 is compartmented above the vehicle body cover 21 and forwardly of the seat 16. A center tunnel 11a, through which the main frame 13 passes, is compartmented below the vehicle body cover 21.

A front wheel 19 is supported through a front fork 18 on the steering head pipe 12. A fuel tank 20 and the seat 16 are supported on the seat rails 14L, 14R. The seat 16 extends toward rear ends of the seat rails 14L, 14R from above the fuel tank 20. The fuel tank 20 is arranged above front halves of the seat rails 14L, 14R and covered by the vehicle body cover 21 and the seat 16.

A pair of left and right first engine brackets 22L, 22R projecting downward are provided on the intermediate portion of the main frame 13. A pair of left and right second engine brackets 23L, 23R and rear arm brackets 24L, 24R are provided on the rear end of the main frame 13. A part of the vehicle body frame 11 is constituted by the first engine brackets 22L, 22R, the second engine brackets 23L, 23R and the rear arm brackets 24L, 24R.

The rear arm brackets 24L, 24R project downward from the rear end of the main frame 13. A pivot shaft 38 is provided on the rear arm brackets 24L, 24R, and a front end of a rear arm 25 is supported on the pivot shaft 38 to be able to swing. A rear wheel 26 is supported on a rear end of the rear arm 25. A rear half of the rear arm 25 is suspended from the vehicle body frame 11 through a cushion unit 27.

As shown in FIG. 6, the second engine brackets 23L, 23R project downward from the rear end of the main frame 13. The left and right second engine brackets 23L, 23R are opposed to each other with a space therebetween in a vehicle width direction.

As shown in FIG. 1, the vehicle body frame 11 supports an engine unit 28 that drives the rear wheel 26. Specifically, as shown in FIG. 5, the engine unit 28 comprises a crankcase 35, a cylinder 43, and a cylinder head 44. The crankcase 35 includes first and second engine mounts 36, 37. The first engine mount 36 projects upward from above a front end of the crankcase 35 and is supported on the first engine brackets 22L, 22R. The second engine mount 37 projects rearward and obliquely upward from above a rear end of the crankcase 35 and is supported on the second engine brackets 23L, 23R (also, see FIG. 6). Thus, the crankcase 35 is suspended from the main frame 13.

As described later in detail, the engine unit 28 comprises an engine 29 and a belt type continuously variable transmission (referred below to as CVT) 30 (see FIG. 7). While the engine 29 is not limited in type, the engine 29 comprises a 4-cycle single cylinder engine in this embodiment.

As shown in FIG. 1, the motorcycle 10 comprises a front fender 31, which covers upper and rear portions of the front wheel 19, and a rear fender 32, which covers a rear and obliquely upper side of the rear wheel 26.

The motorcycle 10 comprises a front cowl 33 and left and right leg shields 34L, 34R in addition to the vehicle body cover 21 described above. The leg shields 34L, 34R are members that cover the front of driver's legs, and extend obliquely vertically as viewed in side view. In addition, the leg shields 34L, 34R may be made integral with or separated from the front cowl 33.

As shown in FIG. 3, the leg shields 34L, 34R are concave-shaped in horizontal section and open rearward. In other words, the leg shields 34L, 34R are substantially C-shaped in transverse section to converge forward. Consequently, a space 34c covered forwardly and laterally by the leg shields 34L, 34R is provided on a back surface side (inside the concave shape) of the leg shields 34L, 34R.

However, the leg shields 34L, 34R are not limited in specific configuration. While the leg shields 34L, 34R according to this embodiment assume the form of a curved plate, they may also assume the form of, for example, a flat plate. Also, while the leg shields 34L, 34R according to the embodiment increase in left and right width from front sides toward rear sides thereof, they may instead be constant in left and right width. Also, the leg shields 34L, 34R do not necessarily extend obliquely vertically but they may extend vertically. The leg shields 34L, 34R may extend straight as viewed in side view or extend curvilinearly. Also, the leg shields 34L, 34R may extend partially straight and extend partially curvilinearly.

According to the embodiment, the leg shields 34L, 34R are made of a resin material. However, the leg shields 34L, 34R are not limited in terms of a material.

While the leg shields 34L, 34R are not specifically limited in length in a longitudinal direction, lower ends 34a of the leg shields 34L, 34R are preferably positioned below an upper end 53t of a transmission case 53 as shown in FIG. 2. Further, the lower ends 34a of the leg shields 34L, 34R are preferably positioned below a vertically intermediate position (a line L1 between a center C1 of a primary sheave shaft 46c and a center C2 of a secondary sheave shaft 62) of the transmission case 53, and are positioned below a lower end 53d of the transmission case 53.

As shown in FIGS. 1 and 2, an air chamber 130 is arranged rearwardly of the right leg shield 34R. The air chamber 130 is formed as a box that is long in one direction and extends obliquely vertically along a longitudinal direction of the leg shield 34R. As shown in FIG. 2, an upper end 130a of the air chamber 130 is positioned above a lower end 17a of the concave space 17 as viewed in side view. Also, a lower end 130b of the air chamber 130 is positioned below an upper end 53t of the transmission case 53. Here, the lower end 130b of the air chamber 130 is positioned at substantially the same level as a lower end 53d of the transmission case 53. Also, the lower end 130b of the air chamber 130 is positioned above the lower end 34a of the leg shield 34R. A major part of the air chamber 130 is arranged in the space 34c, which is compartmented by leg shield 34R (see FIG. 3).

As shown in FIG. 3, the air chamber 130 is shaped along the cross sectional shape of the leg shield 34R. Specifically, the leg shield 34R is formed to converge forward, and the air chamber 130 is also formed to converge.

As shown in FIG. 2, an inlet duct 131 that takes in air is provided on an upper portion of the air chamber 130. The inlet duct 131 is formed from a bent pipe that extends forward and obliquely upward from an upper surface of the air chamber 130. An intake port 132 of the inlet duct 131 is opened forward and obliquely downward to be opposed to a back surface of the leg shield 34R. However, the intake port 132 is not limited in an opened direction.

A filter 133 is accommodated inside the air chamber 130. An intake duct 134 is connected to a back side of a lower portion of the air chamber 130 and leads air in the air chamber 130 to a belt chamber 67 (see FIG. 7) in the transmission casing 53. The intake duct 134 extends in a longitudinal direction and substantially horizontally. According to the embodiment, the intake duct 134 is circular in flow passage section. However, the intake duct 134 is not limited in flow passage sectional shape. While an inside diameter of the intake duct 134 is not specifically limited, it is preferably large to reduce air inlet resistance but preferably small to make the motorcycle slim. An inside diameter of the intake duct 134 may be 0.2 to 0.8 times an outside diameter of, for example, a primary sheave 71 (see FIG. 7) of the CVT 30, or may be 0.3 to 0.6 times. According to the embodiment, the inside diameter of the intake duct 134 is set to be about 0.4 times the primary sheave 71.

The air chamber 130, the inlet duct 131, and the intake duct 134 are preferably formed from a resin material. However, the air chamber 130, the inlet duct 131, and the intake duct 134 are not limited in a material but may be formed from different materials.

The air chamber 130 is not limited to a specific mount. For example, as shown in FIG. 1, a bracket 39 may be provided on the leg shield 34R and the air chamber 130 may be fixed to the bracket 39 by means of bolts, etc.

As shown in FIG. 3, footrests 85L, 85R made of rubber or the like are arranged on left and right sides of the engine unit 28. The footrests 85L, 85R are members on which driver's feet are supported. The left and right footrests 85L, 85R are supported on the crankcase 35 of the engine unit 28 through a metallic connecting bar 87 and a mount plate 88 (see FIGS. 4 and 5) fixed to the connecting bar 87.

The connecting bar 87 passes below a rear half of the crankcase 35 to extend in the vehicle width direction. A left end of the connecting bar 87 projects on the left of the crankcase 35 to support the left footrest 85L. A right end of the connecting bar 87 projects on the right of the transmission case 53 to support the right footrest 85R. As shown in FIG. 4, the mount plate 88 is formed by press molding of a metallic sheet and a recess 89, into which the connecting bar 87 is fitted, is formed on an intermediate portion of the mount plate 88 in the longitudinal direction. The recess 89 abuts against the connecting bar 87 from under, and is welded to an outer peripheral surface of the connecting bar 87.

The mount plate 88 comprises a flange-shaped first mount 90 projecting forwardly of the connecting bar 87, and a flange-shaped second mount 91 projecting rearwardly of the connecting bar 87. The first mount 90 and the second mount 91 are extended axially (a left and right direction) of the connecting bar 87 and opposed to a lower surface 83 of the rear half of the crankcase 35.

The lower surface 83 of the rear half of the crankcase 35 includes four (only two are shown in FIG. 4) bosses 92. The bosses 92 project downward from the lower surface 83 of the crankcase 35 and are formed integral with the crankcase 35. The respective bosses 92 are formed with a bolt hole (not shown). Bolt holes (not shown) are also formed on the mount plate 88 of the footrests 85L, 85R and positioned corresponding to the bosses 92. Bolts 99 clamp the mount plate 88 and the bosses 92 together. In this manner, the footrests 85L, 85R are fixed to the crankcase 35 by bolts 99 through the connecting bar 87 and the mount plate 88.

As shown in FIGS. 1 and 3, a brake pedal 84 is provided forwardly of the right footrest 85R. The brake pedal 84 extends below the transmission case 53 to project rightward and obliquely forward to extend forward and obliquely upward on a right side of the transmission case 53. As shown in FIG. 3, when the motorcycle 10 travels, a driver's right foot 62a adjoins the transmission case 53 and the intake duct 134 in the vehicle width direction.

The internal construction of the engine unit 28 is now explained. As shown in FIG. 7, the engine unit 28 comprises the engine 29, the CVT 30, a centrifugal clutch 41, and a speed reducer 42.

The engine 29 comprises the crankcase 35, the cylinder 43 connected to the crankcase 35, and the cylinder head 44 connected to the cylinder 43. The crankcase includes two divided case blocks, that is, a first case block 35a positioned on the left, and a second case block 35b positioned on the right. The first case block 35a and the second case block 35b abut against each other in the vehicle width direction.

A crankshaft 46 is accommodated in the crankcase 35. The crankshaft 46 extends in the vehicle width direction and is arranged horizontal. The crankshaft 46 is supported by the first case block 35a through a bearing 47 and supported by the second case block 35b through a bearing 48.

A piston 50 is inserted slidably into the cylinder 43. One end of a connecting rod 51 is connected to the piston 50. A crank pin 59 is provided between a left crank arm 46a and a right crank arm 46b of the crankshaft 46. The other end of the connecting rod 51 is connected to the crank pin 59.

The cylinder head 44 has a recess 44a and an intake port and an exhaust port (not shown) communicating with the recess 44a. An ignition (spark) plug 55 is inserted into the recess 44a of the cylinder head 44. As shown in FIG. 4, an intake pipe 52a is connected to the intake port and an exhaust pipe 52 is connected to the exhaust port. As shown in FIGS. 1 and 3, the exhaust pipe 52 extends rearward rightwardly and obliquely downwardly from the cylinder head 44, passes under the transmission case 53 of the engine unit 28 to extend further rearward, and is connected to a muffler 54 arranged on the right side of the rear wheel 26.

As shown in FIG. 7, a left side of the cylinder 43 includes a cam chain chamber 56 that connects an interior of the crankcase 35 and an interior of the cylinder head 44. A timing chain 57 is arranged in the cam chain chamber 56 and is stretched around the crankshaft 46 and a cam shaft 58. The cam shaft 58 rotates with crankshaft 46 to open and close intake and exhaust valves (not shown).

A generator case 66 for a generator 63 is mounted detachably to a left side of a front half of the first case block 35a. The transmission case 53 for the CVT 30 is mounted to a right side of the second case block 35b.

An opening is formed on a right side of a rear half of the second case block 35b and is closed by a clutch cover 60. The clutch cover 60 is fixed detachably to the second case block 35b by a bolt 61 (see FIG. 8).

The transmission case 53 is formed independently of the crankcase 35 and comprises an inner case 53a, which covers an inside (left) of the CVT 30 in the vehicle width direction, and an outer case 53b, which covers an outside (right) of the CVT 30 in the vehicle width direction. The inner case 53a is mounted to a right side of the crankcase 35 and the outer case 53b is mounted to a right side of the inner case 53a. The belt chamber 67, which accommodates the CVT 30, is formed within the inner case 53a and the outer case 53b.

As shown in FIG. 7, a right end of the crankshaft 46 passes through the second case block 35b and the inner case 53a and into the belt chamber 67. A primary sheave 71 of the CVT 30 is fitted onto the right end of the crankshaft 46. Therefore, the primary sheave 71 rotates upon rotation of the crankshaft 46. A right portion (exactly, a portion rightwardly of the bearing 48) of the crankshaft 46 forms the primary sheave shaft 46c.

On the other hand, a left end of the crankshaft 46 passes through the first case block 35a and into the generator case 66. The generator 63 is mounted to the left end of the crankshaft 46. The generator 63 comprises a stator 64 and a rotor 65 opposed to the stator 64. The rotor 65 is fixed to a sleeve 74, which rotates with the crankshaft 46. The stator 64 is fixed to the generator case 66.

The secondary sheave shaft 62 is arranged in the rear half in the crankcase 35 in parallel with the crankshaft 46. As shown in FIG. 8, a right portion of a central portion of the secondary sheave shaft 62 is supported on the clutch cover 60 with a bearing 75. A left portion of the secondary sheave shaft 62 is supported on a left end of the second case block 35b with a bearing 76. A right end of the secondary sheave shaft 62 passes through the second case block 35b and the clutch cover 60 into the belt chamber 67. A secondary sheave 72 of the CVT 30 is connected to the right end of the secondary sheave shaft 62.

As shown in FIG. 7, the CVT 30 comprises the primary sheave 71, the secondary sheave 72, and a V-belt 73 stretched around the primary sheave 71 and the secondary sheave 72. As described above, the primary sheave 71 is mounted to a right side of the crankshaft 46. The secondary sheave 72 is connected to a right side of the secondary sheave shaft 62.

The primary sheave 71 comprises a stationary sheave half 71a positioned outside in the vehicle width direction, and a moving sheave half 71b positioned inside in the vehicle width direction and opposed to the stationary sheave half 71a. The stationary sheave half 71a is fixed to a right end of the primary sheave shaft 46c to rotate with the primary sheave shaft 46c. The moving sheave half 71b is arranged on the left of the stationary sheave half 71a to be mounted slidably to the primary sheave shaft 46c. Accordingly, the moving sheave half 71b rotates with the primary sheave shaft 46c and is slidable axially of the primary sheave shaft 46c. A belt groove is formed between the stationary sheave half 71a and the moving sheave half 71b. A cam surface 111 is formed on a left portion of the moving sheave half 71b and a cam plate 112 is arranged on the left of the cam surface 111. A roller weight 113 is arranged between the cam surface 111 of the moving sheave half 71b and the cam plate 112.

A plurality of vanes 95 for air blasting are formed on a right portion of the stationary sheave half 71a of the primary sheave 71. The vanes 95 lead air to the belt chamber 67 from the intake duct 134 and carry air in the belt chamber 67 to the outside. According to the invention, the vanes 95 are formed to extend spirally and radially outward from a central portion of the stationary sheave half 71a as viewed in side view. However, the vanes 95 are not limited in a specific configuration and in number. Also, an impeller separate from the stationary sheave half 71a may be provided outside the stationary sheave half 71a. Such impeller corresponds to "an air blasting vane formed outside the stationary sheave half 71a".

The secondary sheave 72 comprises a stationary sheave half 72a positioned inside in the vehicle width direction, and a moving sheave half 72b positioned outside in the vehicle width direction and opposed to the stationary sheave half 72a. The moving sheave half 72b is fixed to the right end of the secondary sheave shaft 62. The moving sheave half 72b rotates with the secondary sheave shaft 62 and is slidable axially of the secondary sheave shaft 62. A compression spring 114 is provided on the right end of the secondary sheave shaft 62 and applies leftward bias on the moving sheave half 72b. A shaft core of the stationary sheave half 72a forms a cylindrical-shaped slide collar that is spline-fitted onto the secondary sheave shaft 62.

A reduction ratio of the CVT 30 is determined by a magnitude correlation of a force with which the roller weight 113 pushes the moving sheave half 71b of the primary sheave 71 rightward, and a force with which the compression spring 114 pushes the moving sheave half 72b of the secondary sheave 72 leftward.

More specifically, when the primary sheave shaft 46c is increased in rotational frequency, the roller weight 113 is acted by a centrifugal force to be moved radially outward to push the moving sheave half 71b rightward. Then the moving sheave half 71b is moved rightward, so that the primary sheave 71 is increased in belt stretched diameter. In keeping with this, the secondary sheave 72 is decreased in belt stretched diameter, and the moving sheave half 72b moves rightward against the bias of the compression spring 114. Consequently, a diameter of the V-belt 73 stretched around the primary sheave 71 becomes large while a diameter of the V-belt stretched around the secondary sheave 72 becomes small, so that the reduction ratio is decreased.

On the other hand, when the primary sheave shaft 46c is decreased in rotational frequency, a centrifugal force acting on the roller weight 113 becomes small, so that the roller weight 113 moves radially inward along the cam surface 111 of the moving sheave half 71b and the cam plate 112. Therefore, a force, with which the roller weight 113 pushes the moving sheave half 71b rightward, becomes small. Then the bias of the compression spring 114 exceeds the force relatively and the moving sheave half 72b of the secondary sheave 72 moves leftward, so that the moving sheave half 71b of the primary sheave 71 correspondingly moves leftward. Consequently, a belt stretched diameter of the primary sheave 71 becomes small while a belt stretched diameter of the secondary sheave 72 becomes large, so that the reduction ratio is increased.

As shown in FIG. 7, the outer case 53b comprises a cup-shaped first bulge portion 93 and a second bulge portion 94, which are bulged outward (rightward) in the vehicle width direction. The first bulge portion 93 and the second bulge portion 94 are aligned in a longitudinal direction. The first bulge portion 93 covers the primary sheave 71 and the second bulge portion 94 covers the secondary sheave 72. Provided forwardly of the first bulge portion 93 is a connecting pipe 96 made integral with the outer case 53b. The connecting pipe 96 is connected to the intake duct 134. In addition, a configuration, in which the connecting pipe 96 and the intake duct 134 are connected to each other, is not limitative. According to the embodiment, the connecting pipe 96 and the intake duct 134 are fixed together by means of a band 135. However, the connecting pipe 96 and the intake duct 134 may be threaded to each other. Also, the connecting pipe 96 and the intake duct 134 may be joined together. Further, the connecting pipe 96 and the intake duct 134 may be made integral with each other. That is, the connecting pipe 96 may be extended forward to be connected directly to the air chamber 130.

A right end of the connecting pipe 96, a right end of the first bulge portion 93, and a right end of the second bulge portion 94 are aligned in the vehicle width direction. Therefore, the connecting pipe 96 does not project outward beyond the first bulge portion 93 and the second bulge portion 94. Also, the intake duct 134 does not project outward beyond the first bulge portion 93 and the second bulge portion 94, that is, the transmission case 53. Accordingly, although the intake duct 134 is provided, the motorcycle 10 is not substantially increased in maximum width and the vehicle is made slim.

A sealing groove 68a is formed on the left of a peripheral edge of the inner case 53a, and a right peripheral edge of the second case block 35b is fitted into the sealing groove 68a. In addition, an O-ring 68 is inserted in the sealing groove 68a between the inner case 53a and the second case block 35b. Also, a sealing groove 69a is formed on the right of the peripheral edge of the inner case 53a, and a peripheral edge of the outer case 53b is fitted into the sealing groove 69a. An O-ring 69 is inserted in the sealing groove 69a between the inner case 53a and the outer case 53b. The outer case 53b and the second case block 35b are clamped by a bolt 70 with the inner case 53a interposed therebetween.

As shown in FIG. 9, a front half 121 of the inner case 53a is cup-shaped and bulges leftward, and a rear half 122 of the inner case 53a is cup-shaped and bulges rightward. The front half 121 is formed with a hole 121a, through which the primary sheave shaft 46c of the CVT 30 is inserted. The rear half 122 is formed with a hole 122a, through which the secondary sheave shaft 62 of the CVT 30 is inserted. In addition, FIG. 9 does not show the clutch cover 60 (see FIG. 7) interposed between the inner case 53a and the second case block 35b.

The inner case 53a is provided with vent holes 123. According to the embodiment, the vent holes 123 are circular in shape and are formed above an intermediate position of the inner case 53a in a vertical direction. However, the vent holes 123 are not limited in configuration. Positions of the vent holes 123 are not necessarily limited to an upper portion of the inner case 53a. According to the embodiment, the vent holes 123 are provided on the front half 121 and the rear half 122 of the inner case 53a, respectively. However, the vent holes 123 may be provided only on one of the front half 121 and the rear half 122. The vent holes 123 are not limited in number.

A plurality of vent holes 124 are formed on an underside of the right side of the second case block 35b. More specifically, the second case block 35b includes a peripheral edge 125 provided laterally rightward and shaped to conform to the profile of the transmission case 53. A lower side of the peripheral edge 125 is partially cut out to have slits and is therefore comb-shaped. Therefore, a space 126 compartmented by the second case block 35b and the inner case 53a communicates with an outside of the engine unit 28 through the vent holes 124. In addition, since a right side of the rear half of the second case block 35b is covered by the clutch cover 60, the space 126 is defined between the clutch cover 60 and the inner case 53a on the rear half of the second case block 35b.

The comb-shaped portion of the peripheral edge 125 is provided with reinforcement ribs 128. An oil pan 127 is provided below the vent holes 124.

With such construction, as shown in FIG. 10, air in the belt chamber 67 is led to the space 126 through the vent holes 123 of the inner case 53a and discharged toward the oil pan 127 through the vent holes 124 of the second case block 35b. Consequently, the air is discharged outside the engine unit 28.

According to the embodiment, the lower side of the peripheral edge 125 of the second case block 35b is comb-shaped and has a plurality of slit-shaped vent holes 124. However, the shape of the vent holes 124 is not limited to a slit shape but may be other shapes such as circular shape, etc. The vent holes 124 are not limited in shape, dimensions, number, or the like.

As shown in FIG. 8, the centrifugal clutch 41 is mounted to the left portion of the secondary sheave shaft 62. The centrifugal clutch 41 is a wet multi-disc type clutch with a substantially cylindrical-shaped clutch housing 78 and a clutch boss 77. The clutch housing 78 is spline-fitted onto the secondary sheave shaft 62 to rotate with the secondary sheave shaft 62. The clutch housing 78 mounts thereto a plurality of ring-shaped clutch disks 79. The clutch disks 79 are aligned at intervals axially of the secondary sheave shaft 62.

A cylindrical-shaped gear 80 is fitted around the left portion of the secondary sheave shaft 62 through a bearing 81 so as to rotate. The clutch boss 77 is arranged radially inwardly of the clutch disks 79 and radially outwardly of the gear 80 to mesh with the gear 80. Therefore, the gear 80 rotates with the clutch boss 77. A plurality of ring-shaped friction plates 82 are mounted radially outwardly of the clutch boss 77. The friction plates 82 are aligned at intervals axially of the secondary sheave shaft 62 and are arranged between adjacent clutch disks 79, 79.

A plurality of cam surfaces 83a are formed on a left side of the clutch housing 78. A roller weight 84a is arranged between the cam surfaces 83a and the rightmost clutch disk 79 opposed to the cam surfaces 83.

The centrifugal clutch 41 is automatically switched over between a clutch-in state (connected state) and a clutch-off state (disconnected state) according to a magnitude of a centrifugal force that acts on the roller weight 84a.

That is, when a rotational frequency of the clutch housing 78 becomes equal to or higher than a predetermined rotational frequency, the roller weight 84a moves radially outward by centrifugal force and the clutch disks 79 are pushed leftward by the roller weight 84a. Consequently, the clutch disks 79 and the friction plates 82 come into pressure contact with each other to bring about a clutch-in state, in which a drive force of the secondary sheave shaft 62 is transmitted to an output shaft 85 through the centrifugal clutch 41.

On the other hand, when a rotational frequency of the clutch housing 78 becomes less than a predetermined rotational frequency, a centrifugal force acting on the roller weight 84a becomes small, so that the roller weight 84a moves radially inward. Consequently, pressure contact between the clutch disks 79 and the friction plates 82 is released to bring about a clutch-off state, in which a drive force of the secondary sheave shaft 62 is not transmitted to an output shaft 85. In addition, in FIG. 8, a front (upper in FIG. 8) portion of the centrifugal clutch 41 represents a clutch-off state and a rear (lower in FIG. 8) portion thereof represents a clutch-in state.

The speed reducer 42 is interposed between the centrifugal clutch 41 and the output shaft 85. The speed reducer 42 comprises a speed change shaft 100 arranged in parallel to the secondary sheave shaft 62 and the output shaft 85. The speed change shaft 100 is supported rotatably on the first case block 35a with a bearing 101 therebetween and supported rotatably on the second case block 35b with a bearing 102 therebetween. A first speed change gear 103 that meshes with gear 80 is provided on a right end of the speed change shaft 100.

A second speed change gear 104 that is smaller in diameter than first speed change gear 103 is provided centrally of the speed change shaft 100. A third speed change gear 105 that meshes with second speed change gear 104 is formed on an outer peripheral side of a right end of the output shaft 85. An inner peripheral side of the right end of the output shaft 85 is supported on a left end of the secondary sheave shaft 62 with a bearing 106. Accordingly, the output shaft 85 is supported rotatably on the secondary sheave shaft 62 with the bearing 106 arranged coaxial (on a straight line) with the secondary sheave shaft 62. Also, a central portion of the output shaft 85 is supported rotatably on the left end of the second case block 35b with a bearing 107.

With such construction, the clutch boss 77 and the output shaft 85 are connected to each other through the gear 80, the first speed change gear 103, the speed change shaft 100, the second speed change gear 104, and the third speed change gear 105. Therefore, the output shaft 85 rotates upon rotation of the clutch boss 77.

A left end of the output shaft 85 extends through the first case block 35a to project outside the crankcase 35. Fixed to the left end of the output shaft 85 is a drive sprocket 108. Stretched around the drive sprocket 108 is a chain 109 as a power transmission mechanism that transmits a drive force of the output shaft 85 to the rear wheel 26. In addition, the power transmission mechanism is not limited to the chain 109 but may comprise a transmission belt, a gear mechanism, which comprises a combination of a plurality of gears, a drive shaft, and other members.

The construction of the motorcycle 10 is described above. Now, a cooling operation of the CVT 30 is explained.

When the engine unit 28 operates, the primary sheave shaft 46c of the CVT 30 rotates and the vanes 95 of the stationary sheave half 71a of the primary sheave 71 rotate correspondingly. Consequently, a suction force is generated and leads air to the belt chamber 67 from the intake duct 134.

Then, air is sucked into the air chamber 130 through the intake port 132 (see FIG. 2). The air passes through a filter 133 to be purified and is thereafter sucked into belt chamber 67 through the intake duct 134 and the connecting pipe 96. The air sucked into belt chamber 67 flows around the primary sheave 71, the secondary sheave 72, and the V-belt 73 to cool the primary sheave 71, the secondary sheave 72, and the V-belt 73.

The air, having cooled the primary sheave 71, the secondary sheave 72, and the V-belt 73, is discharged from the belt chamber 67 through the vent holes 123 of the inner case 53a (see FIG. 10) to flow into the space 126 between the inner case 53a and the second case block 35b. The air in the space 126 is discharged outside the engine unit 28 through the vent holes 124 formed on a lower portion of the second case block 35b. The CVT 30 is continuously cooled by air flowing in this manner.

As described above, the air chamber 130 and the intake duct 134, which form at least a part of the cooling air passage for the CVT 30, are arranged between the transmission case 53 and the leg shield 34R. Therefore, the space between the transmission case 53 and the leg shield 34R is effectively used as a space in which a cooling air passage is provided. Accordingly, enough space for the provision of an air passage is ensured without upsizing the vehicle body cover 21. Thus, an air passage having enough flow passage cross sectional area is provided, thereby improving cooling capacity for the CVT 30 and downsizing the vehicle body cover 21. According to the embodiment, both improved reliability of the CVT 30 and reduction in the motorcycle size are achieved.

The air chamber 130 and the intake duct 134 are arranged outside the vehicle body cover 21. Therefore, the vehicle body cover 21 can be downsized and the vehicle slimmed as compared with conventional motorcycles, in which an air passage communicating with a belt chamber 67 is covered by a vehicle body cover 21. Also, the intake duct 134 can be set large in flow passage cross sectional area without being restricted by the vehicle body cover 21. Accordingly, air flow resistance in the intake duct 134 can be reduced, thus improving the CVT 30 in cooling capacity.

As shown in FIG. 2, according to the embodiment, the intake port 132, through which air is led to the air chamber 130, is opened toward the leg shield 34R. Therefore, since the front of the intake port 132 is covered by the leg shield 34R, water, dust, etc. are in inhibited from flowing from the intake port 132. Accordingly, water, dust, etc. are inhibited from flowing into the belt chamber 67, thus improving the CVT 30 in reliability.

Also, the air chamber 130 extends obliquely upward along the leg shield 34R and therefore does not protrude greatly from the leg shield 34R. Also, the intake port 132, through which air is taken into the air chamber 130, is arranged in a relatively high position (above the lower end 17a of the concave space 17 in the embodiment). Accordingly, water, dust, etc. are further inhibited from flowing into the air chamber 130 and the belt chamber 67.

As described above, since the air chamber 130 extends obliquely upward along the leg shield 34R, a relatively wide space longitudinally of the leg shield 34R is effectively used as a space in which the air chamber 130 is provided.

As shown in FIG. 3, the leg shield 34R is shaped in horizontal section to be concave and open rearward. Therefore, since the leg shield 34R covers not only the front but also the side of the air chamber 130, etc., a space covered by the leg shield 34R is increased, thus ensuring a large space in which the air chamber 130 or the like is provided.

Also, a major part of the air chamber 130 is in a concave-shaped inside (in the space 34c) of the leg shield 34R. Therefore, the concave-shaped inside space is effectively used as a space in which the air chamber 130 is provided. Accordingly, a large space for air chamber 130 is provided. Also, the leg shield 34R protects the air chamber 130.

The intake port 132 of the air chamber 130 is also arranged in the concave-shaped inside of the leg shield 34R. Therefore, water, dust, etc. are further effectively inhibited from flowing into the air chamber 130.

Also, the air chamber 130 extends in horizontal sectional shape along the leg shield 34R. More specifically, the air chamber 130 has a sectional shape tapering forward in the same manner as the leg shield 34R. Therefore, a space behind the leg shield 34R is maximized as a space in which the air chamber 130 is provided.

Also, the foot rest 85R is provided outwardly of the transmission case 53 in the vehicle width direction as viewed in plan view to support a passenger's foot 62a (see FIG. 3). The transmission case 53 and the intake duct 134 are arranged inside (leftward) the foot rest 85R. Therefore, a space inwardly of the foot rest 85R is effectively used as a space in which the transmission case 53 and the intake duct 134 are provided. Also, since the intake duct 134 is arranged straight toward the transmission case 53 without being obstructed by the foot rest 85R, air flow resistance in the intake duct 134 is reduced. Therefore, the cooling capacity of CVT 30 is further improved.

As shown in FIG. 3, the exhaust pipe 52 of the engine 29 passes under the intake duct 134 and the transmission case 53 to extend rearward. Therefore, interference between the exhaust pipe 52 and the intake duct 134 is easily avoided. Accordingly, enough flow passage cross sectional area for the intake duct 134 is ensured without being obstructed by the exhaust pipe 52.

As shown in FIG. 7, a tip end of the primary sheave shaft 46c is positioned inwardly of a tip end of the secondary sheave shaft 62 in the vehicle width direction. Therefore, a lateral space has a margin on a side of the primary sheave 71 as compared with that on a side of the secondary sheave 72. The intake duct 134 is connected to a side of the transmission case 53 toward the primary sheave 71. That is, the intake duct 134 is connected to a side, on which a surplus space is present laterally. Accordingly, a connection (the connecting pipe 96 in the embodiment) of the intake duct 134 and the transmission case 53 is prevented from projecting laterally, which promotes slimming of the vehicle.

Also, the vanes 95 for air blasting are provided outside of the stationary sheave half 71*a* of the primary sheave 71. Therefore, air in the air chamber 130 is smoothly led into the belt chamber 67. Accordingly, the CVT 30 is further improved in cooling capacity.

In addition, the leg shields 34L, 34R are opened rearward. As shown in FIG. 11, however, covers 117L, 117R are mounted to back sides of the leg shields 34L, 34R and a rear portion of the space 34*c* is partitioned by the covers 117L, 117R. In addition, the air chamber 130 is arranged between leg shield 34R and cover 117R. Cover 117R is formed with a hole 118, through which intake duct 134 extends.

In this manner, by providing the cover 117R, which covers the air chamber 130 from rearward, behind the leg shield 34R, water, dust, etc. is further inhibited from flowing into the air chamber 130. Also, a back portion of the air chamber 130 is protected by the cover 117R.

A slim vehicle body is especially desired in a saddle-ride type vehicle of a type, such as the described moped-type vehicle, in which a concave-shaped space recessed downward is formed forwardly of a seat and a passenger straddles a vehicle body frame to ride. Therefore, from the viewpoint of making a vehicle body slim, there are many restrictions on the position of an air passage communicating with a belt chamber that are not involved in saddle-ride type vehicles of other types. According to the embodiment, however, a CVT 30 having improved reliability is compatible with a slim body. Accordingly, the effect of the invention is particularly conspicuous in a vehicle body of this type. Nevertheless, the invention is not limited to the saddle-ride type vehicle of the type described above.

Second Embodiment

As shown in FIG. 1, according to the first embodiment, the intake duct 134 extends forwardly of the transmission case 53 and the air chamber 130 extends from around a lower end of the leg shield 34R to around an intermediate portion thereof in the vertical direction. In contrast, as shown in FIG. 12, according to a second embodiment of the invention, an air chamber 141 is arranged above an intermediate portion of a leg shield 34R and a part of an intake duct 142 extends obliquely upward along the leg shield 34R.

According to the second embodiment, the intake duct 142 is connected to a first bulge portion 93 (see FIG. 7) of a transmission case 53 from obliquely upward. The intake duct 142 extends forwardly and obliquely upwardly of the transmission case 53 to be bent upward at the back of the leg shield 34R, and then extends obliquely upward along the leg shield 34R to be connected to the air chamber 141.

The air chamber 141 is arranged in a position above a lower end 17*a* of a concave-shaped space 17 ahead of a seat 16. An inlet duct 143 of the air chamber 141 is arranged in the vicinity of an upper portion of the leg shield 34R. An intake port 144 of the inlet duct 143 is opened toward the upper portion of the leg shield 34R. A filter 145 is accommodated within the air chamber 141.

The remainder of the construction is the same as that of the first embodiment and an explanation therefor is omitted.

The second embodiment produces the same effect as the first embodiment. In addition, according to the second embodiment, the air chamber 141 is arranged in a higher position, so that water, dust, etc. splashed from a road surface cannot flow into the air chamber 141. Accordingly, water, dust, etc. are further inhibited from flowing into the belt chamber 67, thus improving the reliability of CVT 30.

Third Embodiment

According to the first embodiment and the second embodiment, an intake passage, through which air is introduced into belt chamber 67, is provided between the transmission case 53 and the leg shield 34R. In contrast, according to a third embodiment of the invention, an exhaust passage, through which air discharged from a belt chamber 67 is led, is provided between a transmission case 53 and a leg shield 34R as shown in FIG. 13.

That is, according to the third embodiment, an exhaust duct 151 is connected to a connecting pipe 96 of the transmission case 53. The exhaust duct 151 is extended forwardly of the transmission case 53 and curved obliquely upward and rearwardly of the leg shield 34R. Further, the upwardly curved exhaust duct 151 is curved downward above an intermediate portion of the leg shield 34R in a vertical direction to extend to the vicinity of a lower end 34*a* of the leg shield 34R. A downstream end 151*a* of the exhaust duct 151 is opened downward. In addition, the exhaust duct 151 extends obliquely vertically along the leg shield 34R.

According to the third embodiment, a connecting pipe 152 is formed on a second bulge portion 94 of the transmission case 53 (see FIG. 15). The connecting pipe 152 is formed integral with an outer case 53*b* of the transmission case 53. As shown in FIG. 13, the connecting pipe 152 extends rearwardly and obliquely upwardly of the transmission case 53. An air chamber 154 is connected to the connecting pipe 152 through an intake duct 153. A filter 155 is accommodated within the air chamber 154 and an inlet duct 156 is mounted to an upper portion of the air chamber 154. An intake port 157 of the inlet duct 156 is opened forward and obliquely downward. A right side of the air chamber 154 is covered by a cover 160. In addition, the cover 160 is formed separately of a vehicle body cover 21.

As shown in FIG. 14, the air chamber 154 is arranged on the right of a vehicle body frame 11 (more specifically, a seat rail 14R) and arranged in a position aligned longitudinally of the transmission case 53 as viewed in plan view. As viewed in plan view, a right end of the transmission case 53 and a right end of the air chamber 154 are substantially positionally aligned. Therefore, the air chamber 154 does not project laterally from the transmission case 53, so that a motorcycle 10 is made slim.

As shown in FIG. 15, according to the third embodiment, vanes 158 for air blasting are provided on a side of a CVT 30 toward a secondary sheave 72. That is, the vanes 158 for leading an air to the belt chamber 67 are formed on an outer portion of a moving sheave half (outer sheave half) 72*b* of the secondary sheave 72. In addition, according to the third embodiment, vent holes 123 are not formed on an inner case 53*a* and vent holes 124 are not formed on a second case block 35*b*.

According to the third embodiment, air is sucked into the air chamber 154 through the intake port 157 (see FIG. 13). The air passes through the filter 155 to be purified and is thereafter sucked into belt chamber 67 through an intake duct 153 and the connecting pipe 152. The air sucked into belt chamber 67 cools the primary sheave 71, the secondary sheave 72, and the V-belt 73 and then is discharged outside through the connecting pipe 96 and the exhaust duct 151. Such flow of air cools the CVT 30.

According to the third embodiment, a space between the transmission case 53 and the leg shield 34R is effectively used as a space for the provision of an exhaust passage, through which air from the belt chamber 67 is discharged. Accordingly, a space for the provision of an exhaust passage is ensured without making the vehicle body cover 21 large in size. Consequently, both an exhaust passage having enough flow passage area to improve cooling capacity for the CVT 30 and downsizing of the vehicle body cover 21 are realized.

As described above, the invention is useful for saddle-ride type vehicles such as motorcycles, etc.

The particular embodiments of the invention described in this document should be considered illustrative, rather than restrictive. Modification to the described embodiments may be made without departing from the spirit of the invention as defined by the following claims.

The invention claimed is:

1. A saddle-ride type vehicle comprising:
    an underbone frame arranged to provide a concave-shaped space recessed downward in front of a seat of the vehicle;
    an engine unit supported below the underbone frame and including an engine including a cylinder, a transmission case including a belt chamber, and a V-belt continuously variable transmission accommodated in the belt chamber;
    an air passage communicating with the belt chamber; and
    a leg shield arranged to extend substantially vertically along sides of the underbone frame in a vehicle width direction; wherein
    a lower end of the leg shield is arranged below an upper end of the transmission case; and
    a portion of the air passage is arranged between the transmission case and the leg shield and between the upper end of the transmission case and a lower end of the transmission case; wherein
    the portion of the air passage overlaps with the cylinder in a side view of the vehicle, and the portion of the air passage that overlaps with the cylinder in the side view of the vehicle is positioned forward of a foremost portion of the transmission case.

2. The saddle-ride type vehicle according to claim 1, wherein the air passage extends rearwardly of the leg shield in a direction along the leg shield.

3. The saddle-ride type vehicle according to claim 1, wherein the leg shield is concave in horizontal sectional shape and opened rearward.

4. The saddle-ride type vehicle according to claim 3, wherein a portion of the air passage is disposed in the concave shape of the leg shield.

5. The saddle-ride type vehicle according to claim 4, further comprising a cover provided behind the leg shield to cover the portion of the air passage disposed in the concave shape of the leg shield from the rear.

6. The saddle-ride type vehicle according to claim 3, wherein the air passage comprises an intake duct through which air is led to the belt chamber; and the air passage includes an intake port disposed in the concave shape of the leg shield.

7. The saddle-ride type vehicle according to claim 1, further comprising a footrest provided outwardly of the transmission case in the vehicle width direction to support a passenger's foot.

8. The saddle-ride type vehicle according to claim 1, further comprising an exhaust gas passage that passes below the transmission case to discharge exhaust gases from the engine unit.

9. The saddle-ride type vehicle according to claim 1, wherein
    the V-belt continuously variable transmission includes a primary sheave, a secondary sheave disposed behind the primary sheave, a primary sheave shaft extending in the vehicle width direction to rotate the primary sheave, and a secondary sheave shaft extending in the vehicle width direction to rotate with the secondary sheave;
    a tip end of the primary sheave shaft is arranged inwardly of a tip end of the secondary sheave shaft in the vehicle width direction; and
    the air passage is connected to a side of the transmission case toward the primary sheave.

10. The saddle-ride type vehicle according to claim 1, wherein the air passage comprises an intake duct through which air is led to the belt chamber.

11. The saddle-ride type vehicle according to claim 1, wherein
    the V-belt continuously variable transmission includes a primary sheave, a secondary sheave disposed behind the primary sheave, a primary sheave shaft extending in the vehicle width direction to rotate the primary sheave, and a secondary sheave shaft extending in the vehicle width direction to rotate with the secondary sheave;
    the primary sheave includes a moving sheave half supported on the primary sheave shaft to rotate with the primary sheave shaft and to be axially movable, and a stationary sheave half supported on the primary sheave shaft outwardly of the moving sheave in a vehicle width direction to rotate with the primary sheave shaft and to be axially immovable;
    the air passage includes an intake duct connected to a side of the transmission case toward the primary sheave; and
    a vane arranged to blast air is provided outwardly of the stationary sheave half in the vehicle width direction.

12. The saddle-ride type vehicle according to claim 1, further comprising:
    a cover that covers the underbone frame; wherein
    the air passage is arranged outside the cover.

13. The saddle-ride type vehicle according to claim 1, wherein
    the air passage comprises an intake duct through which air is led to the belt chamber; and
    the air passage includes an intake port that opens toward the leg shield.

14. The saddle-ride type vehicle according to claim 1, wherein
    the air passage includes an air chamber that accommodates a filter; and
    the air chamber extends rearwardly of the leg shield in a direction along the leg shield.

15. The saddle-ride type vehicle according to claim 1, wherein
    the air passage includes an air chamber that accommodates a filter; and
    a horizontal sectional shape of the air chamber substantially corresponds to a horizontal sectional shape of the leg shield.

16. The saddle-ride type vehicle according to claim 1, further comprising a rear wheel and a power transmission mechanism that transmits a drive force of the engine to the rear wheel.

17. The saddle-ride type vehicle according to claim 1, wherein the concave-shaped space is arranged rearwardly of the leg shield.

18. The saddle-ride type vehicle according to claim 1, wherein the air passage includes an intake duct and an air chamber; and the intake duct is arranged between the upper end of the transmission case and the lower end of the leg shield.

19. The saddle-ride type vehicle according to claim 1, wherein the portion of the air passage extends substantially horizontally from the lower end of the leg shield to a forward side of the transmission case.

* * * * *